US011323617B2

(12) United States Patent
Sugioka et al.

(10) Patent No.: US 11,323,617 B2
(45) Date of Patent: May 3, 2022

(54) VIDEO TRANSMISSION APPARATUS AND VIDEO RECEPTION APPARATUS

(71) Applicant: Sony Semiconductor Solutions Corporation, Kanagawa (JP)

(72) Inventors: Tatsuya Sugioka, Tokyo (JP); Tomohiro Takahashi, Kanagawa (JP); Hiroki Ui, Tokyo (JP); Yoshiaki Inada, Tokyo (JP); Masatsugu Kobayashi, Kanagawa (JP); Masaru Takamoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/486,005

(22) PCT Filed: Feb. 13, 2018

(86) PCT No.: PCT/JP2018/004918
§ 371 (c)(1),
(2) Date: Aug. 14, 2019

(87) PCT Pub. No.: WO2018/155258
PCT Pub. Date: Aug. 30, 2018

(65) Prior Publication Data
US 2020/0053281 A1    Feb. 13, 2020

(30) Foreign Application Priority Data
Feb. 21, 2017    (JP) .............................. JP2017-029809

(51) Int. Cl.
*G06T 3/40*        (2006.01)
*H04N 5/232*    (2006.01)
(Continued)

(52) U.S. Cl.
CPC ....... *H04N 5/23238* (2013.01); *G06T 3/4038* (2013.01); *H04N 1/3876* (2013.01); *H04N 5/23293* (2013.01); *H04N 21/4728* (2013.01)

(58) Field of Classification Search
None
See application file for complete search history.

(56) References Cited

U.S. PATENT DOCUMENTS 7,194,144 B1 *    3/2007    Sakai ...................... G06T 11/60
                                                                          382/284
2006/0062480 A1    3/2006    Fujiyama et al.
(Continued)

FOREIGN PATENT DOCUMENTS

CN    101313578 A    11/2008
CN    102566918 A    7/2012
(Continued)

OTHER PUBLICATIONS

T. C. Thang et al., "Spatial Scalability of Multiple ROIs in Surveillance Video," Joint Video Team (JVT) of ISO/IEC MPEG & ITU-T VCEG (ISO/IEC JTC1/SC29/WG11 and ITU-T SG16 Q.6) 15th Meeting: Busan, KR, 16-22, File No. XP030005983, pp. 1-13, Apr. 13, 2005.
(Continued)

*Primary Examiner* — Yi Wang
(74) *Attorney, Agent, or Firm* — Michael Best & Friedrich LLP

(57) ABSTRACT

The present disclosure includes a video transmission apparatus, a video reception apparatus, an image transmission apparatus, an image reception apparatus, and a system. The image transmission apparatus includes a detection circuitry, a generation circuitry, and a transmission circuitry. The generation circuitry is configured to generate a first image based on a first piece of positional information from a plurality of pieces of positional information, the first image
(Continued)

including the overlap region and corresponding to a first region of interest of two or more regions of interest. The generation circuitry is also configured to generate one or more second images based on an overlap region and the plurality of pieces of positional information, the one or more second images excluding the overlap region and corresponding to regions of interest other than the first region of interest of the two or more regions of interest.

22 Claims, 17 Drawing Sheets

(51) Int. Cl.
*H04N 1/387* (2006.01)
*H04N 21/4728* (2011.01)

(56) References Cited

U.S. PATENT DOCUMENTS

| | | | |
|---|---|---|---|
| 2008/0130984 A1* | 6/2008 | Ahn | H04N 19/527 382/154 |
| 2013/0294506 A1 | 11/2013 | Kang et al. | |
| 2014/0270487 A1 | 9/2014 | Park | |
| 2016/0080664 A1* | 3/2016 | Henry | H04N 9/04 348/164 |

FOREIGN PATENT DOCUMENTS

| | | |
|---|---|---|
| CN | 103581544 A | 2/2014 |
| CN | 105122345 A | 12/2015 |
| CN | 105979216 A | 9/2016 |
| CN | 106233745 A | 12/2016 |
| JP | 2009-51088 A | 3/2009 |
| JP | 2010-93572 A | 4/2010 |
| JP | 2012-209831 A | 10/2012 |
| JP | 2013-164834 A | 8/2013 |
| JP | 2014-039219 A | 2/2014 |
| JP | 2016-201756 A | 12/2016 |
| WO | 2006/112620 A1 | 10/2006 |
| WO | 2007/035065 A1 | 3/2007 |

OTHER PUBLICATIONS

Japanese Office Action dated Sep. 15, 2020 for corresponding Japanese Application No. 2017-029809.
Chinese Office Action dated Apr. 21, 2021 for corresponding Chinese Application No. 201880011920X.
Chinese Office Action dated Feb. 8, 2022 for corresponding Chinese Application No. 201880011920X.
Kong Chao, "Research on image retrieval method based on region of interest", full text, China Master's Theses Full-text Database (information technology) Sep. 15, 2015.

* cited by examiner

[Fig. 1]
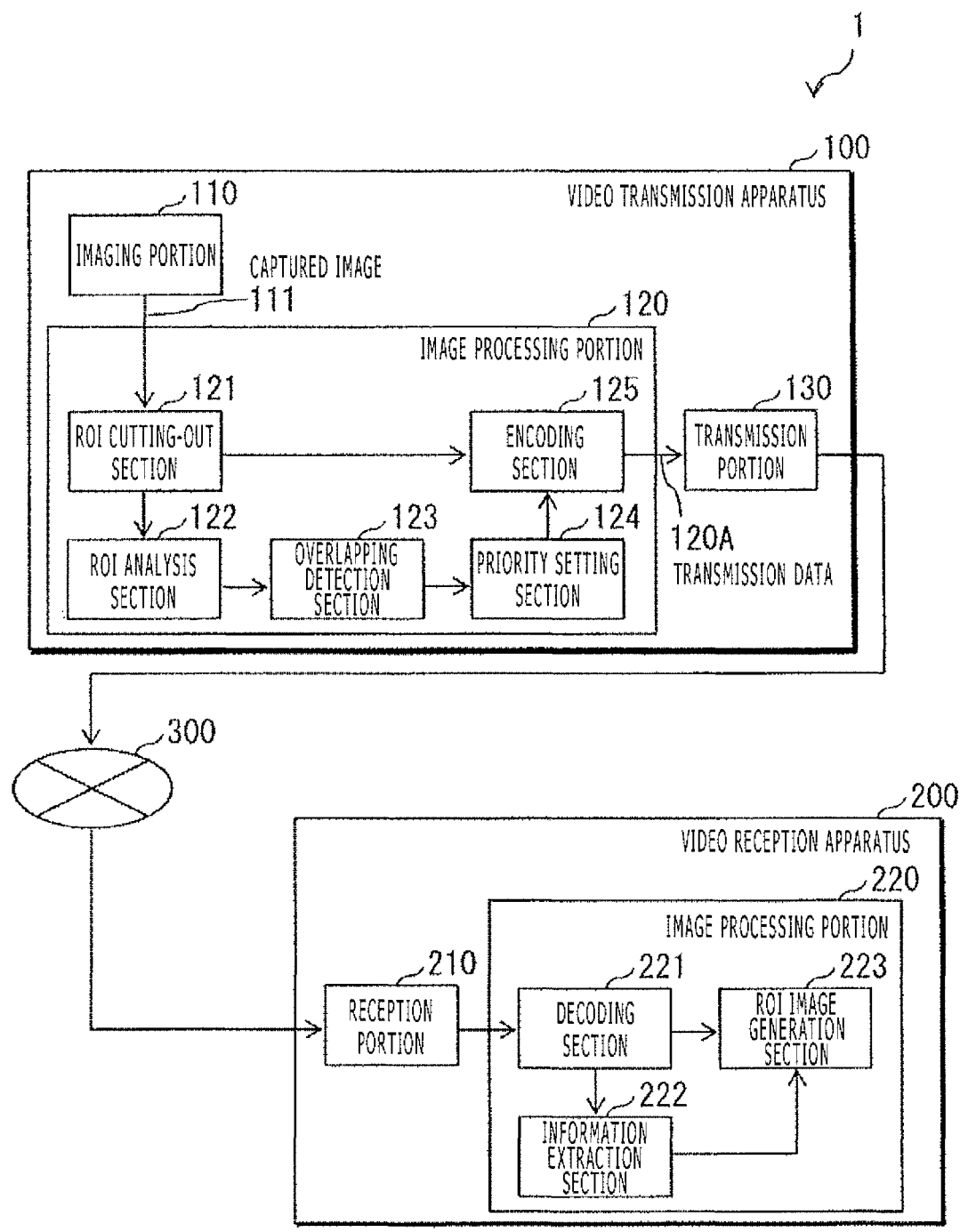

[Fig. 2]
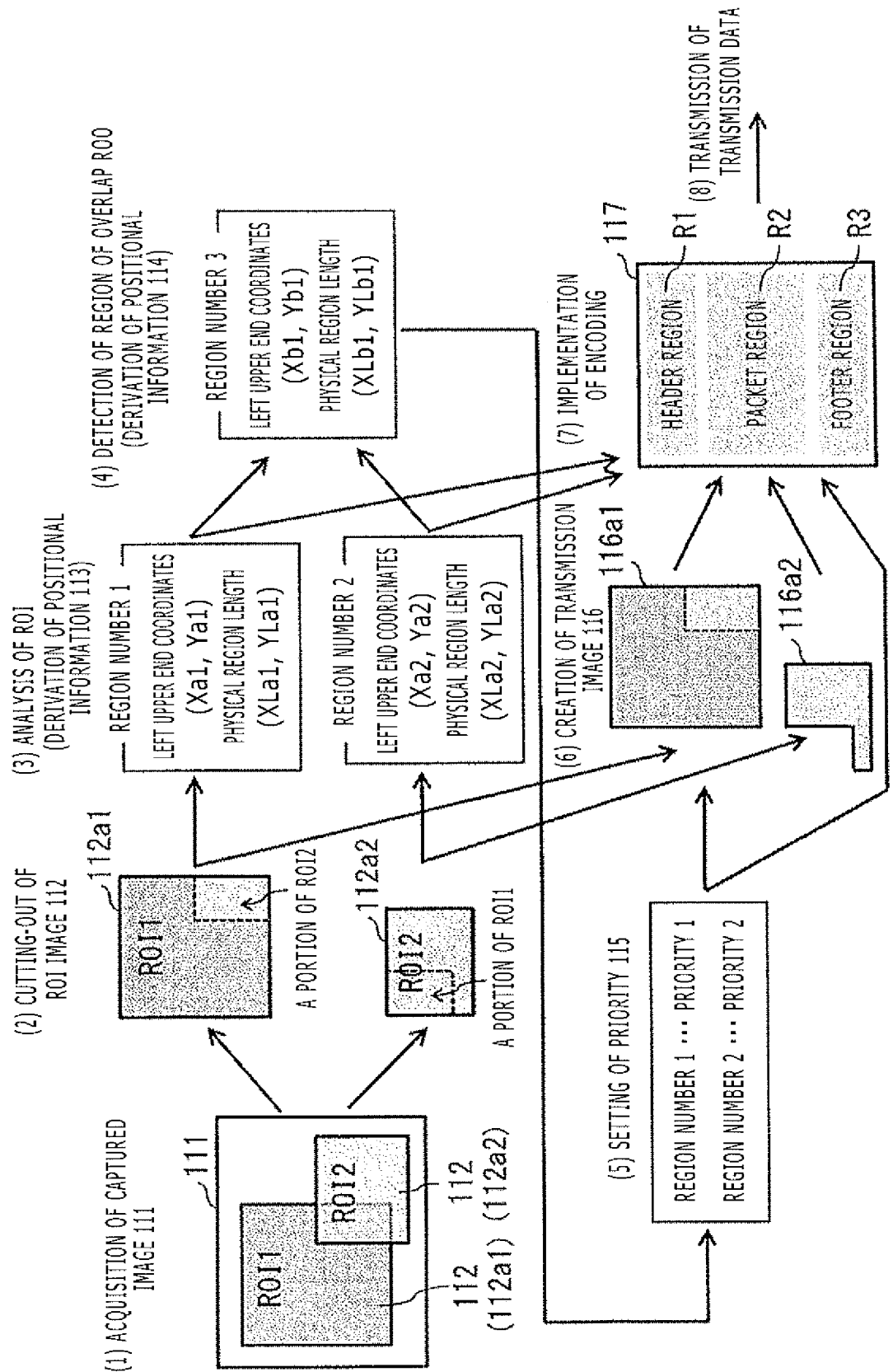

[Fig. 3]
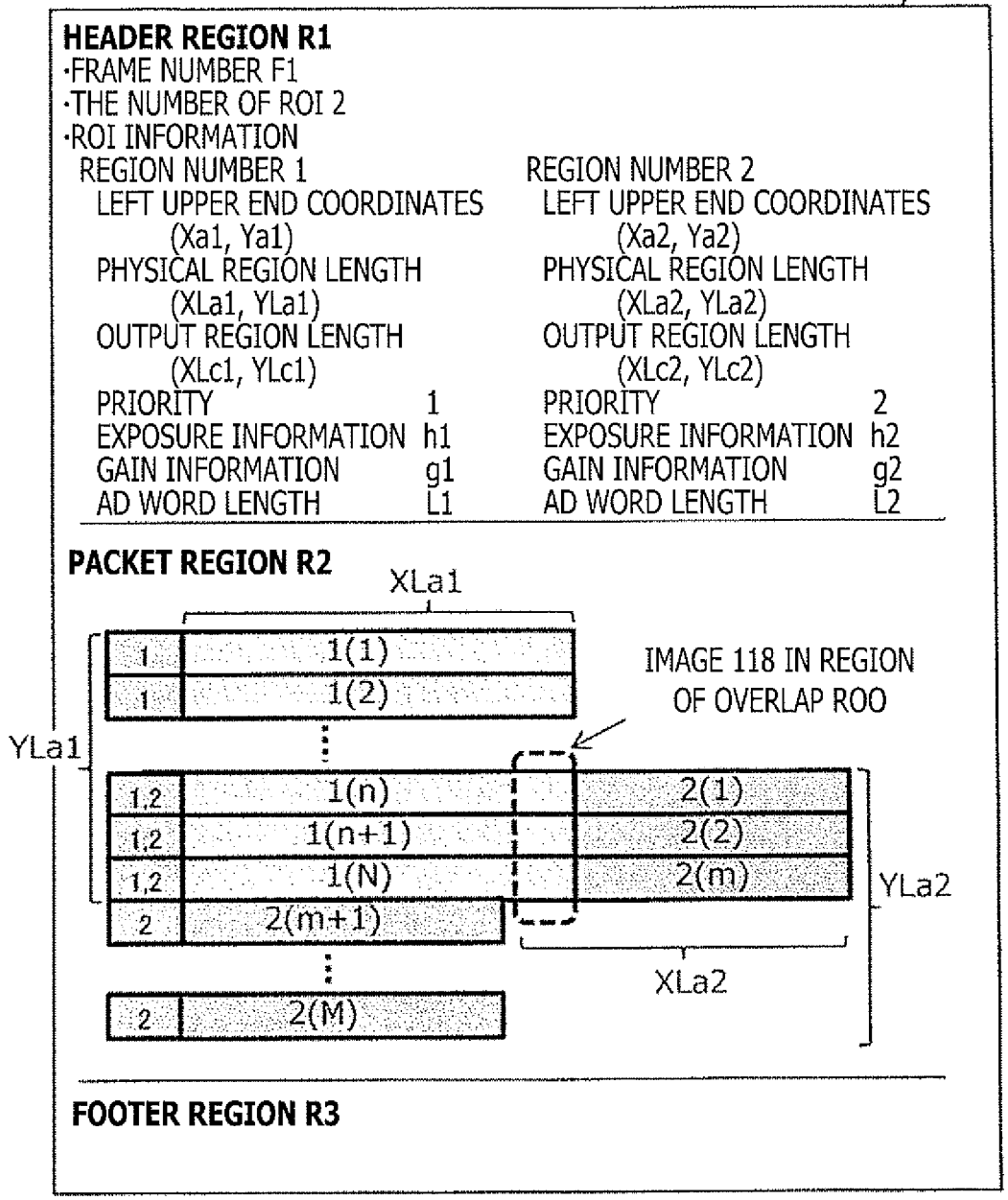

[Fig. 4]
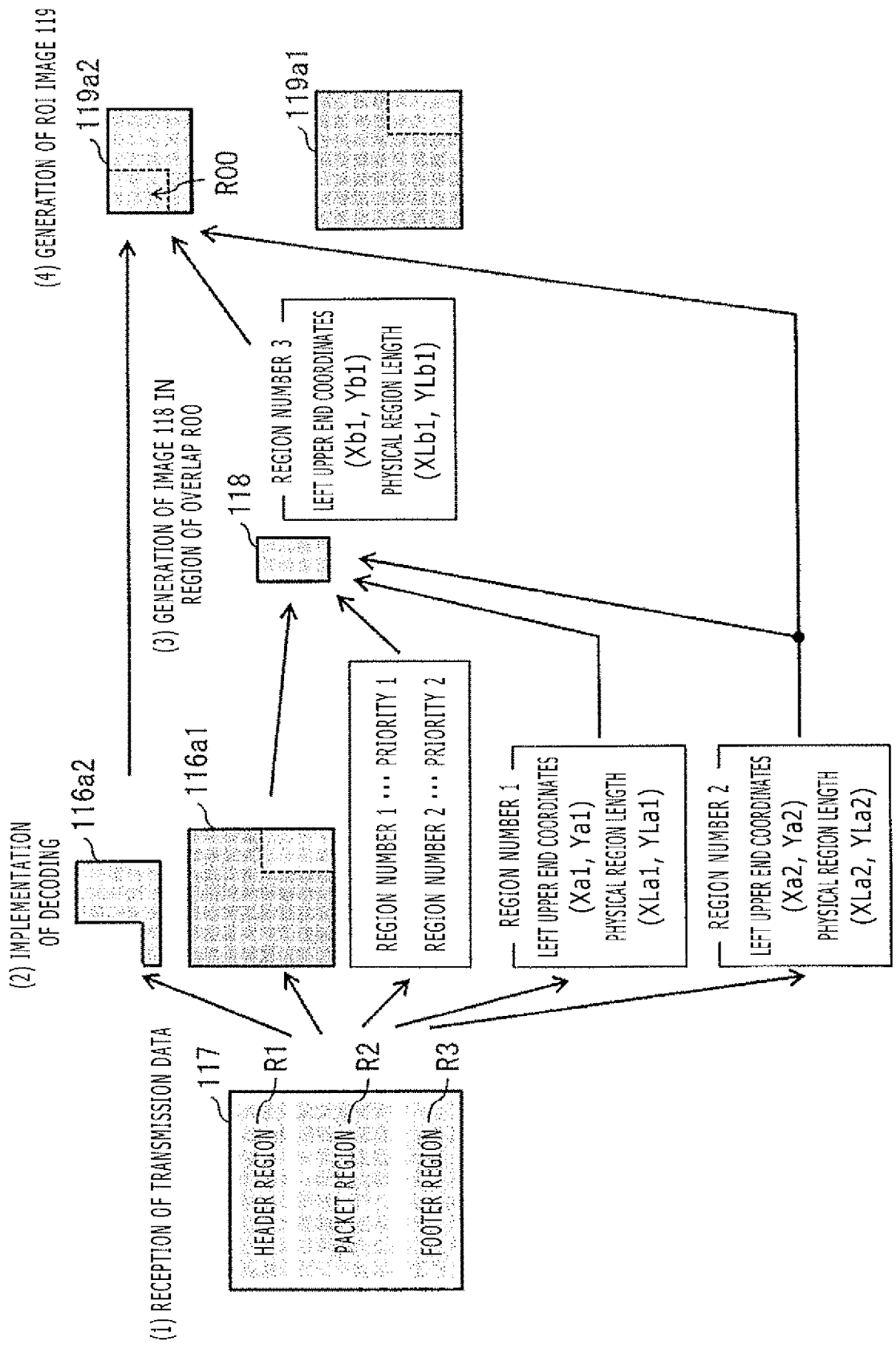

[Fig. 5]
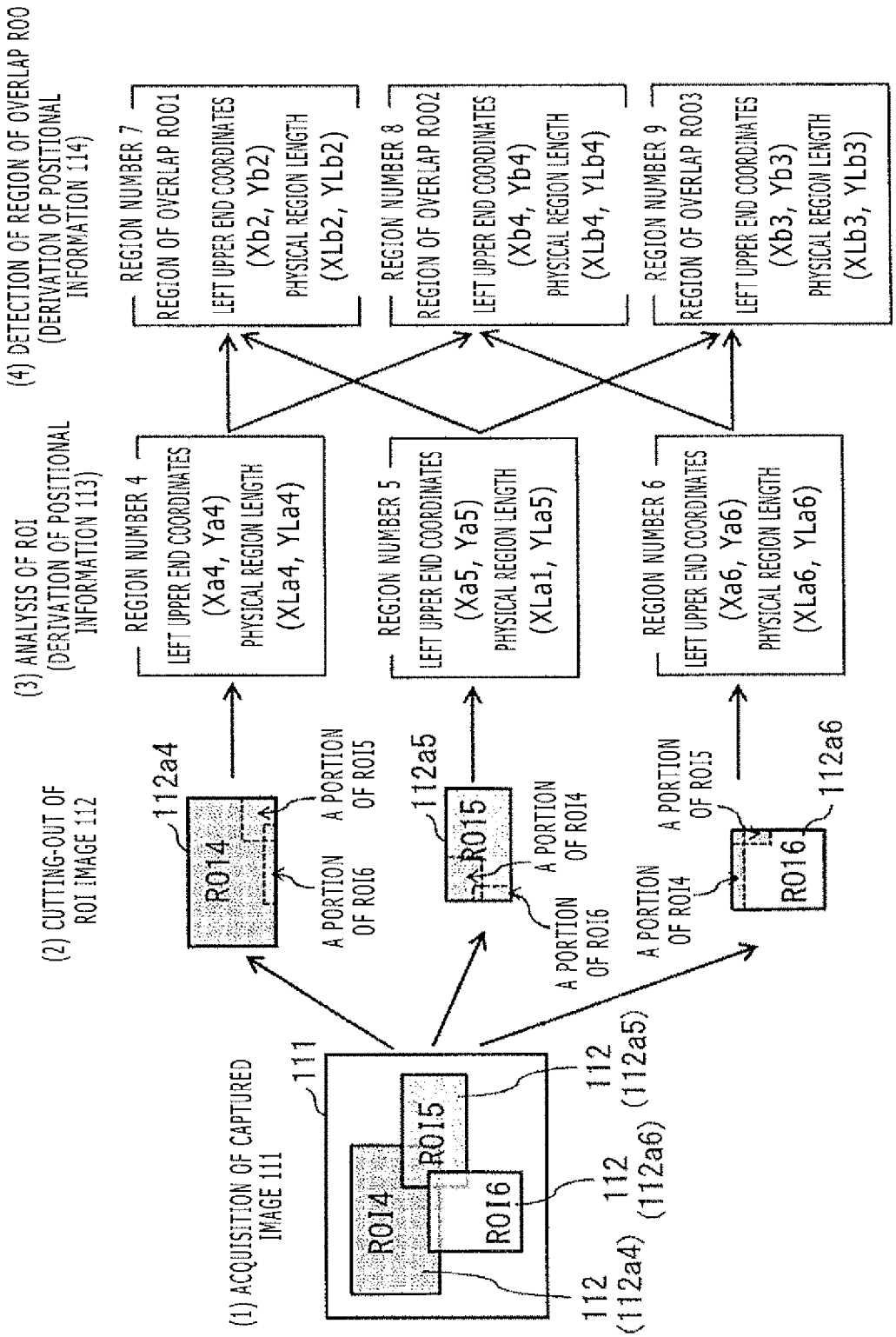

[Fig. 6]
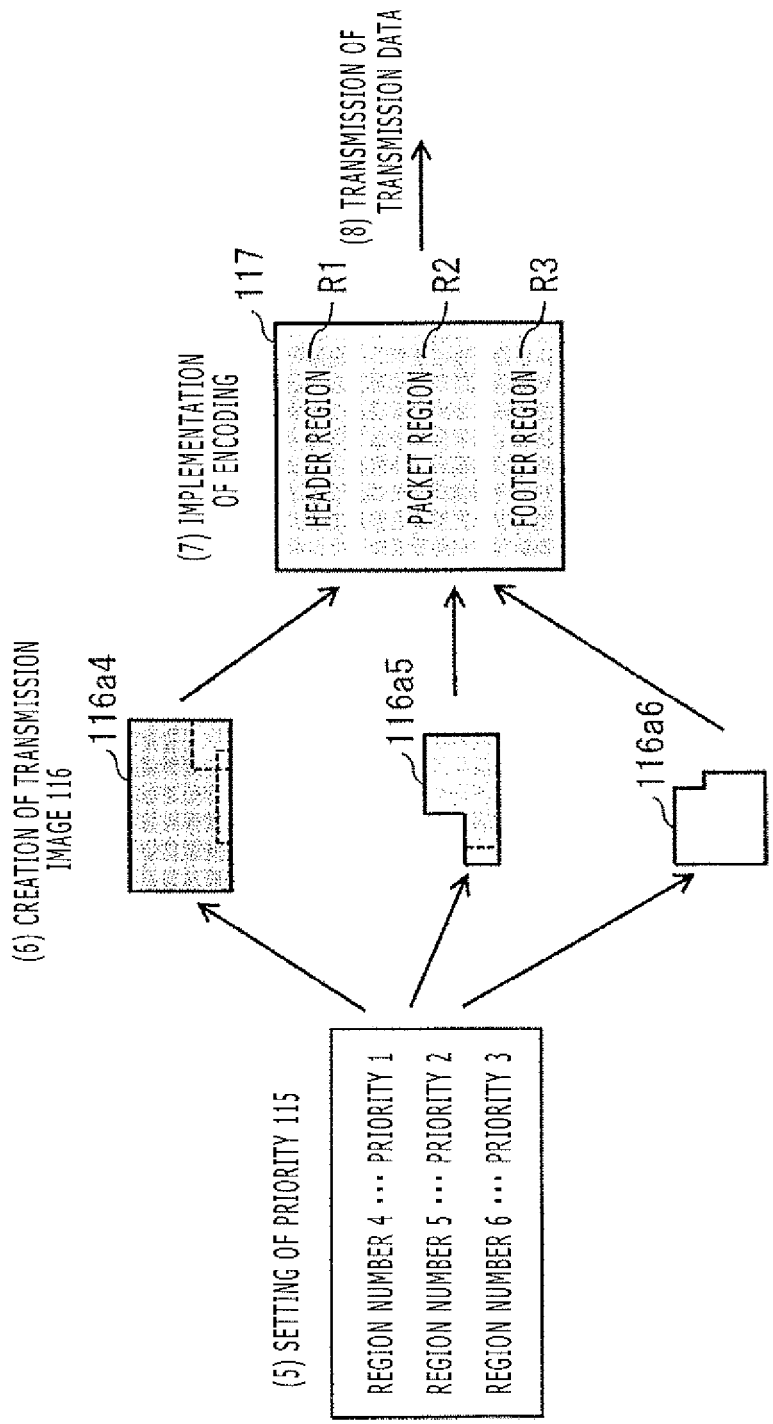

[Fig. 7A]

```
HEADER REGION R1
·FRAME NUMBER F2
·THE NUMBER OF ROI 3
·ROI INFORMATION
  REGION NUMBER 4                    REGION NUMBER 5
    LEFT UPPER END COORDINATES         LEFT UPPER END COORDINATES
        (Xa4, Ya4)                         (Xa5, Ya5)
    PHYSICAL REGION LENGTH             PHYSICAL REGION LENGTH
        (XLa4, YLa4)                       (XLba, YLa5)
    OUTPUT REGION LENGTH               OUTPUT REGION LENGTH
        (XLc4, YLc4)                       (XLc5, YLc5)
    PRIORITY              1            PRIORITY              2
    EXPOSURE INFORMATION  h4           EXPOSURE INFORMATION  h5
    GAIN INFORMATION      g4           GAIN INFORMATION      g5
    AD WORD LENGTH        L4           AD WORD LENGTH        L5
  REGION NUMBER 6
    LEFT UPPER END COORDINATES (Xa6, Ya6)
    PHYSICAL REGION LENGTH     (XLa6, YLa6)
    OUTPUT REGION LENGTH       (XLc6, YLc6)
    PRIORITY              3
    EXPOSURE INFORMATION  h6
    GAIN INFORMATION      g6
    AD WORD LENGTH        L6
```

117

[Fig. 7B]
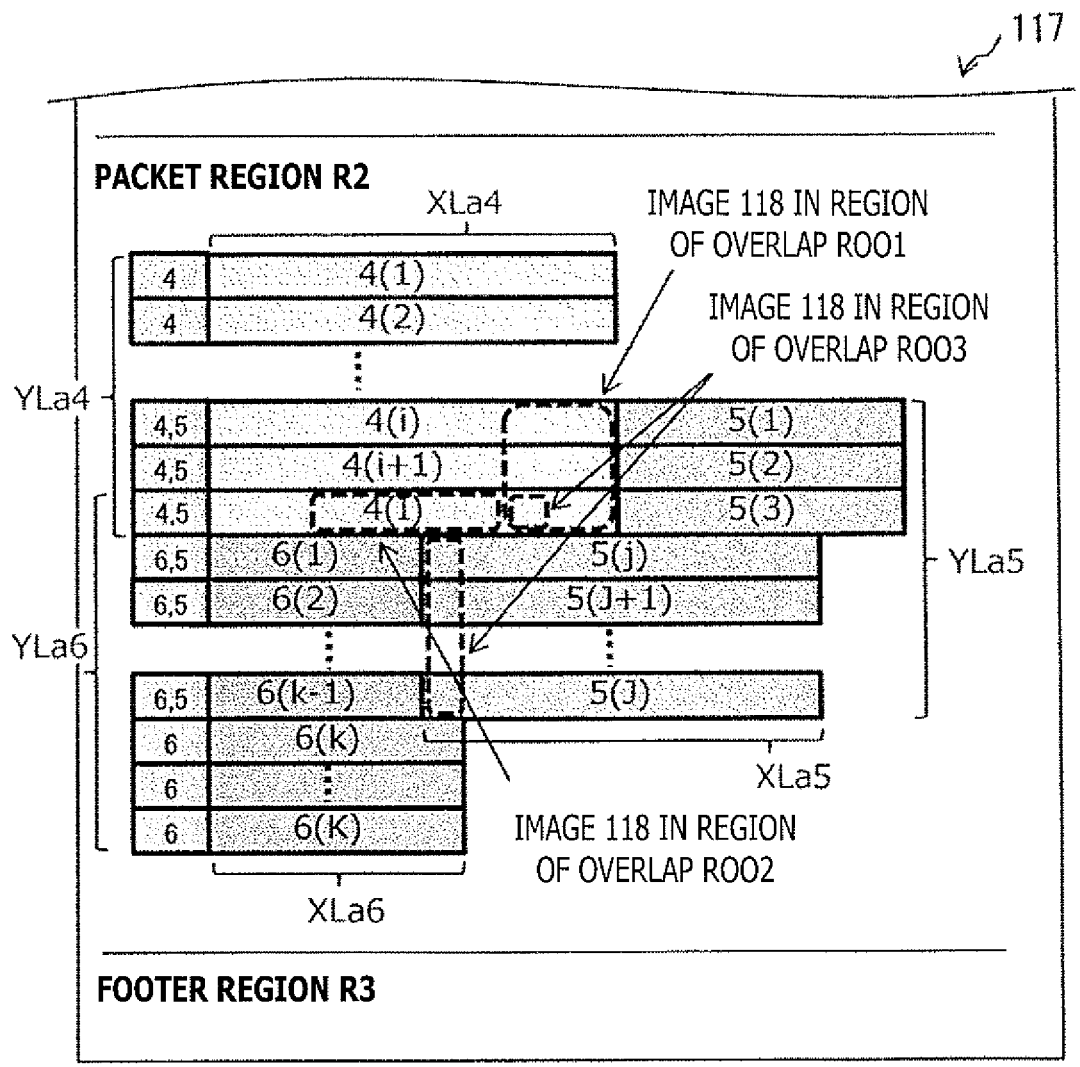

[Fig. 8]
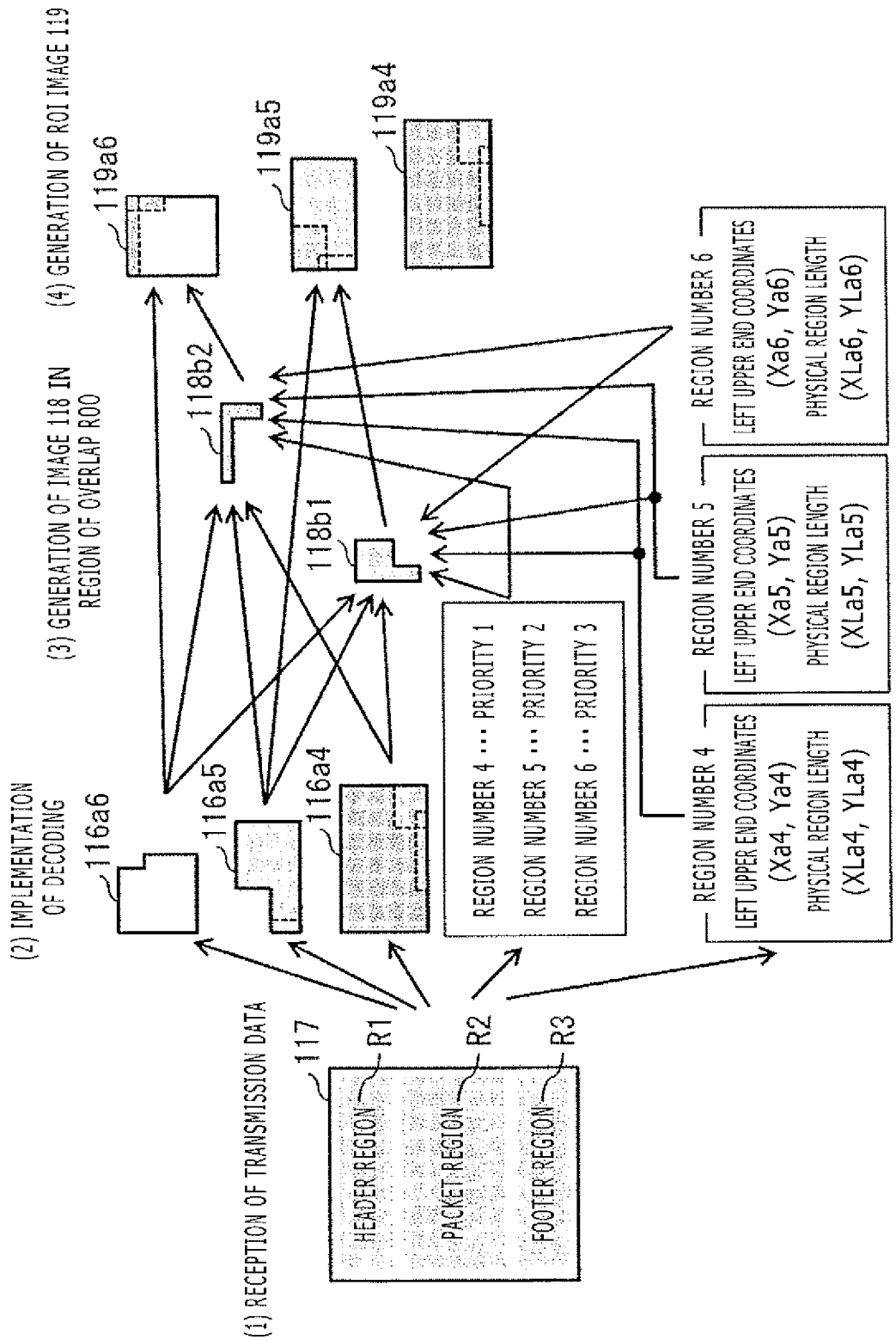

[Fig. 9]
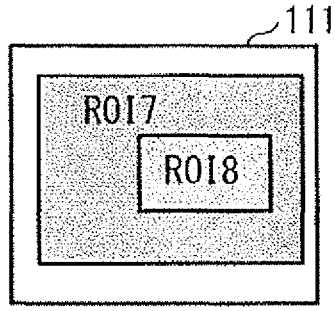
[Fig. 10]
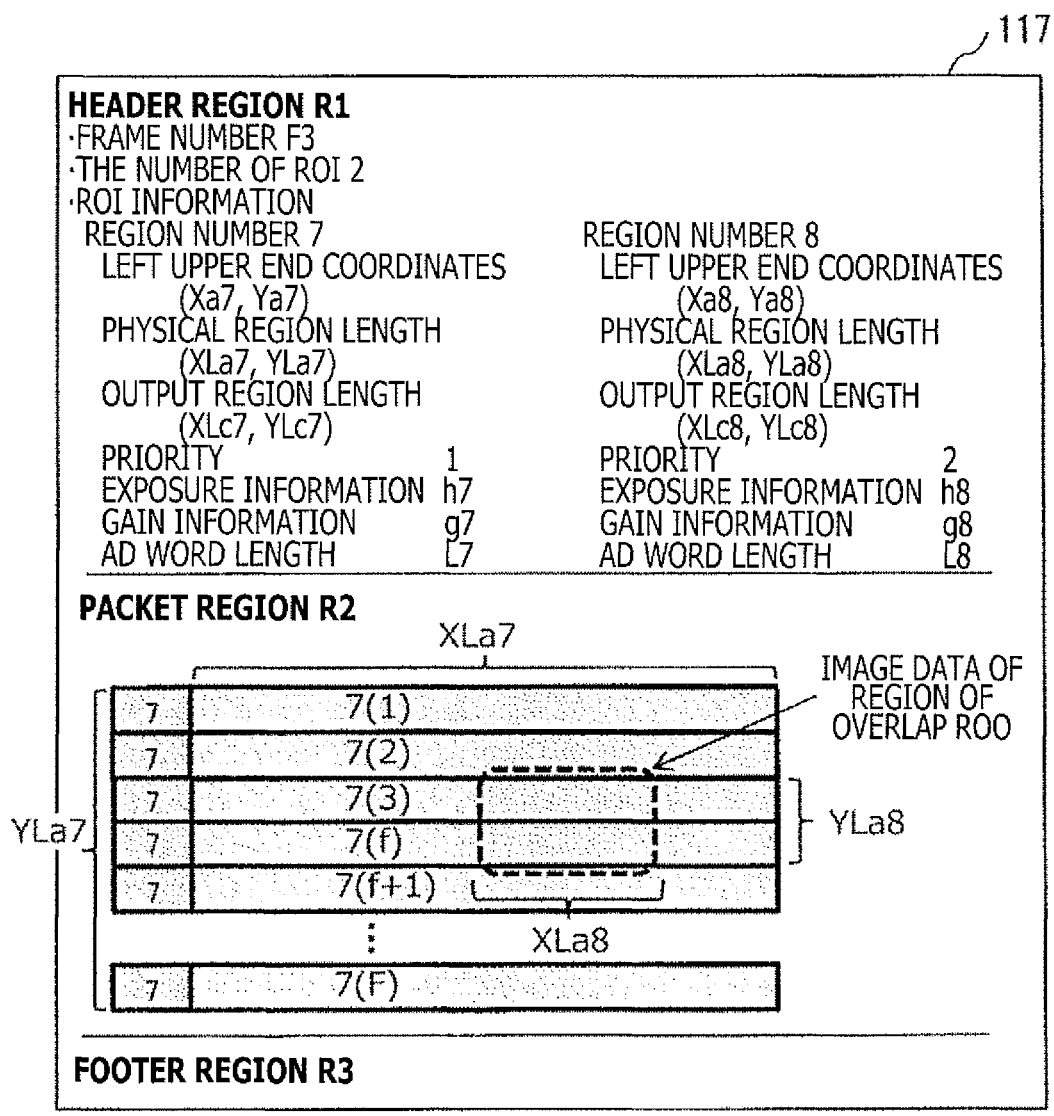

[Fig. 11]
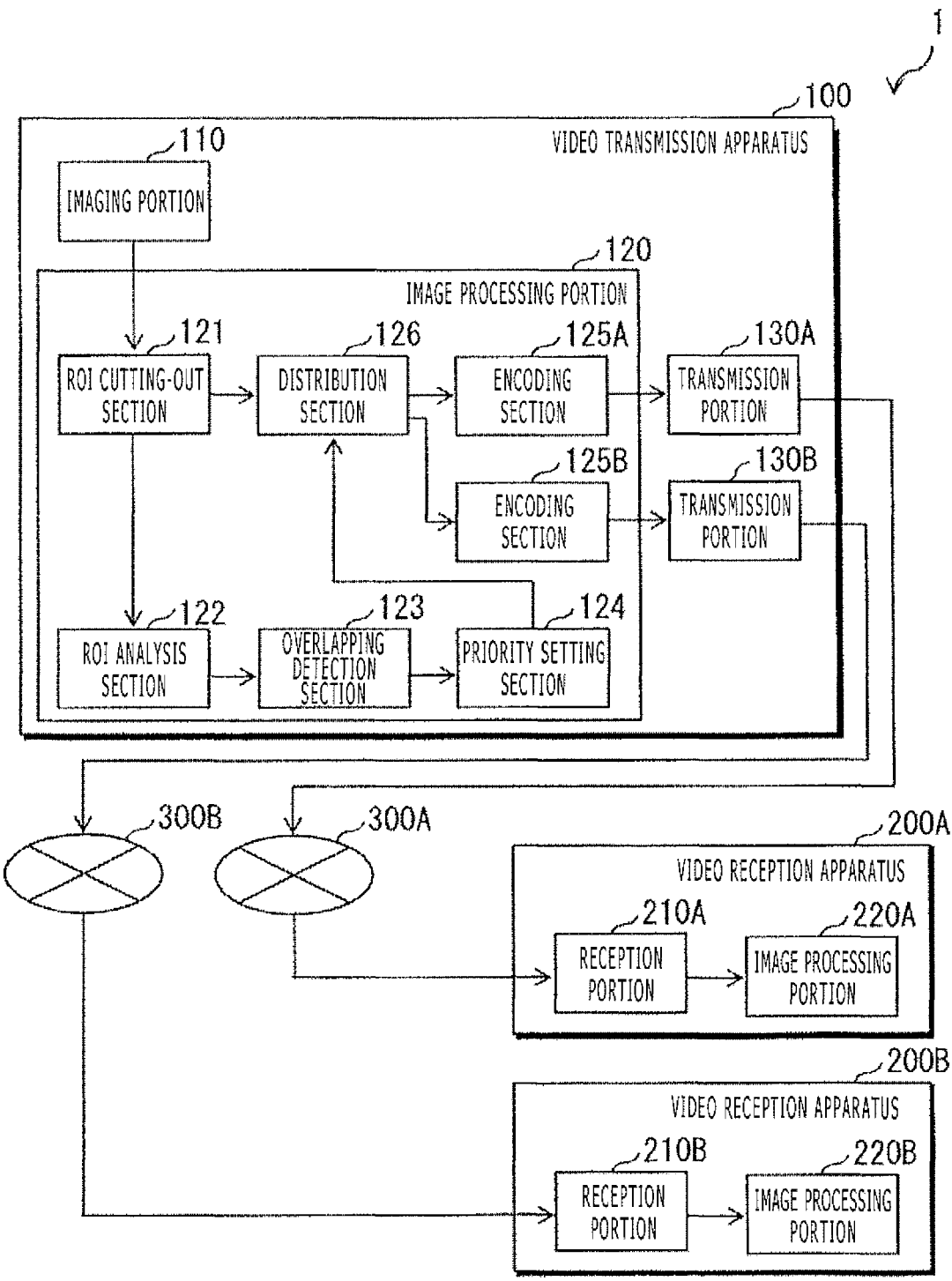

[Fig. 12]
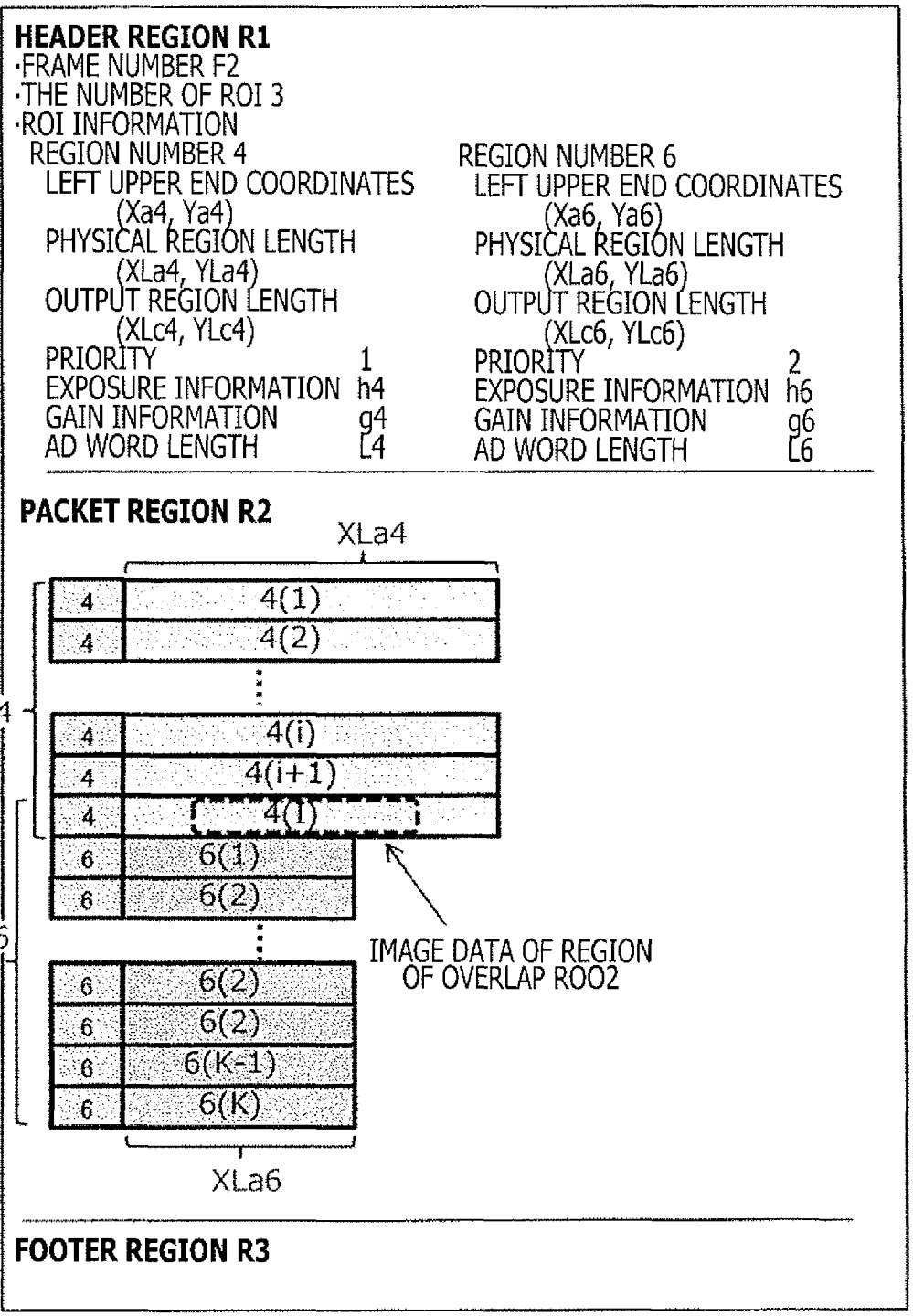

[Fig. 13]
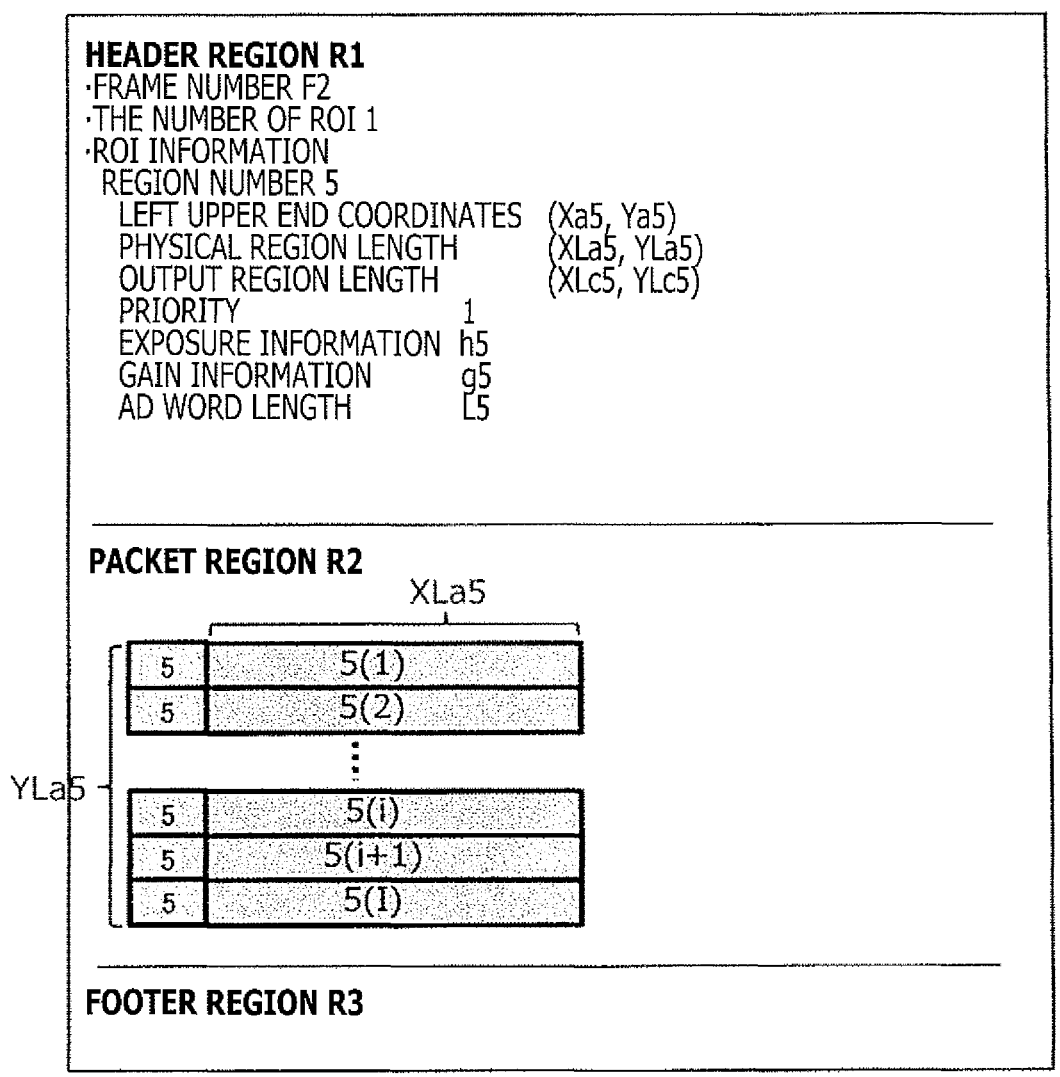

[Fig. 14]
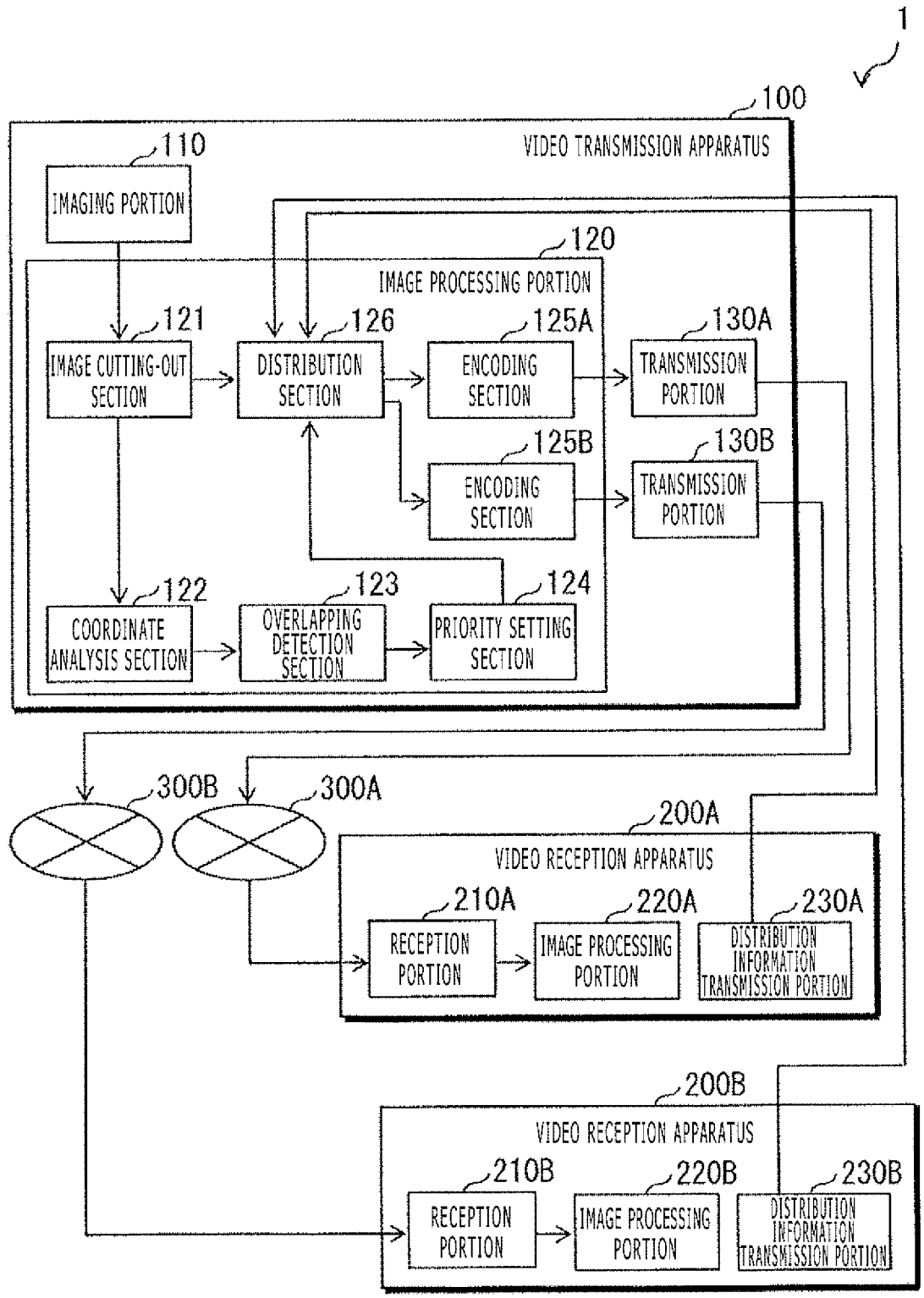

[Fig. 15]
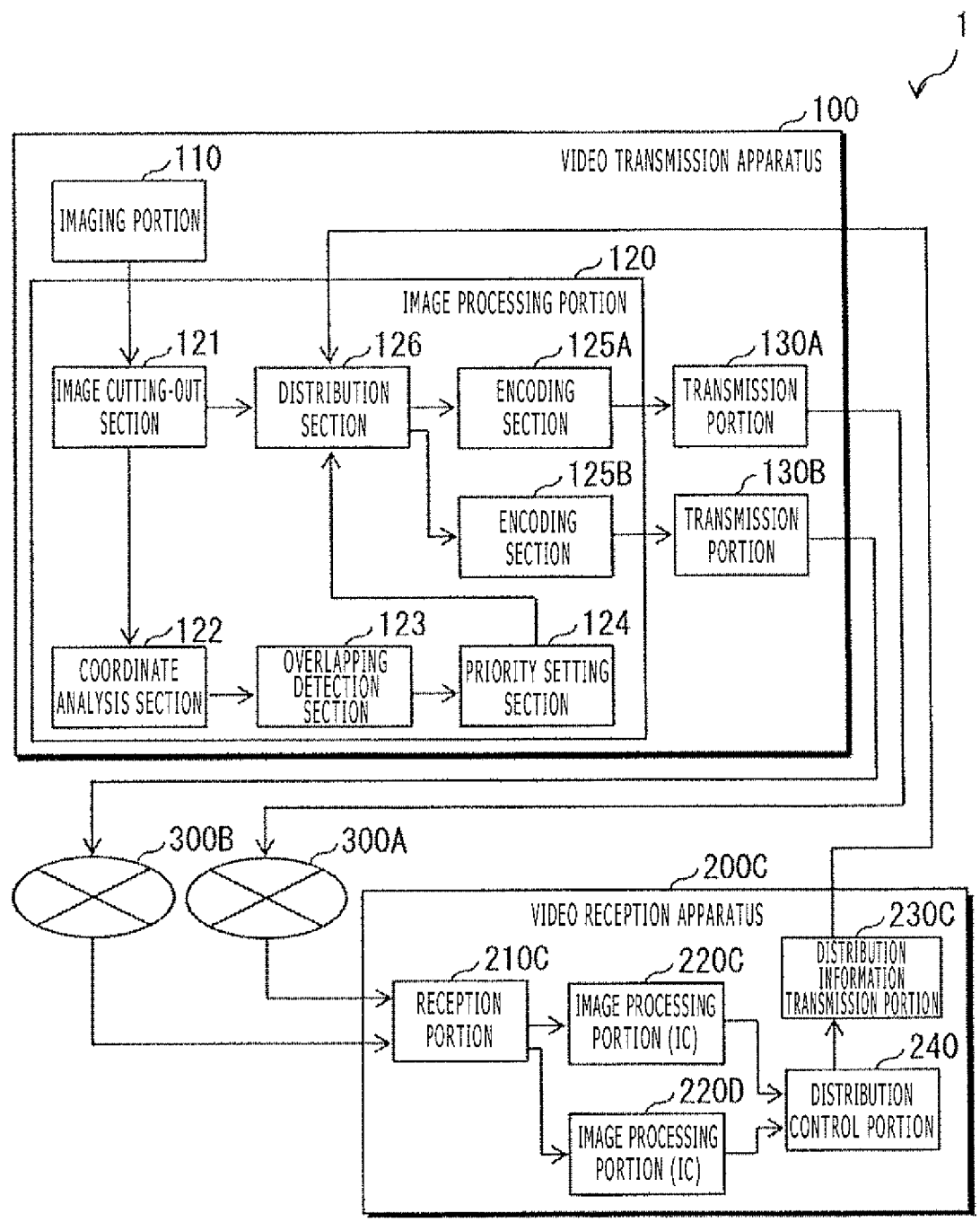

[Fig. 16]
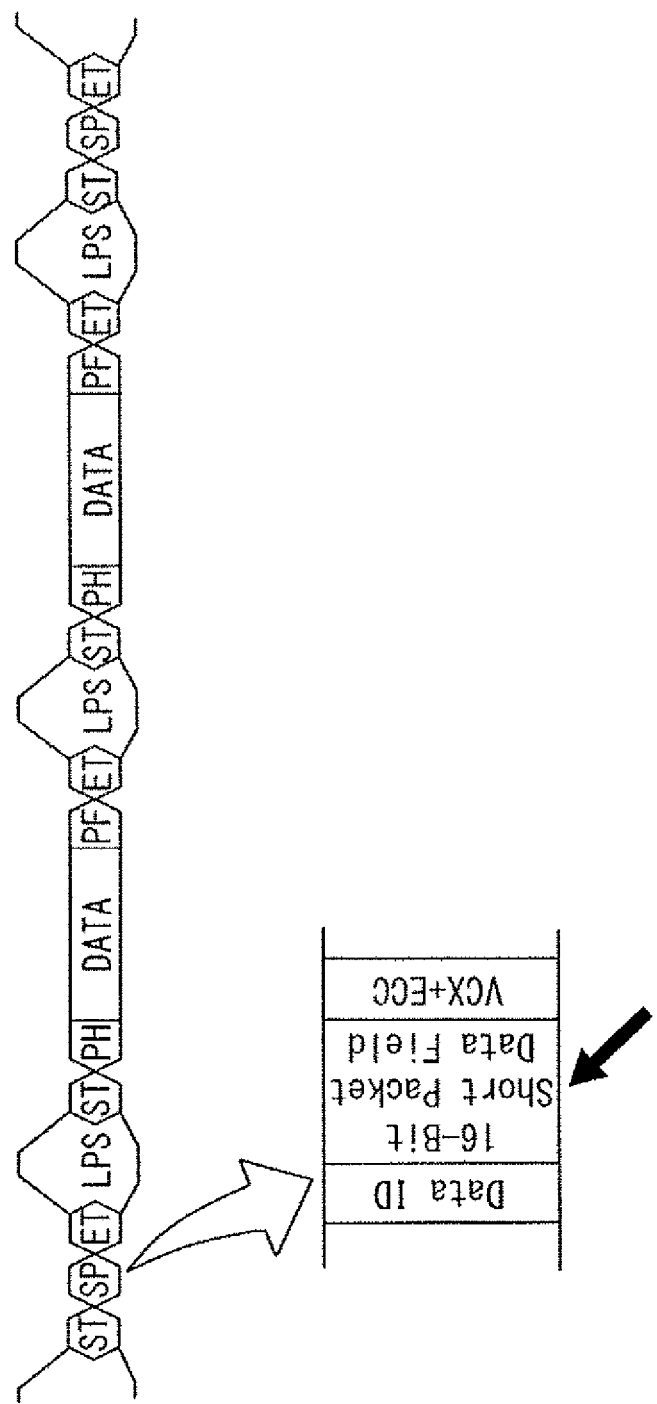

[Fig. 17]
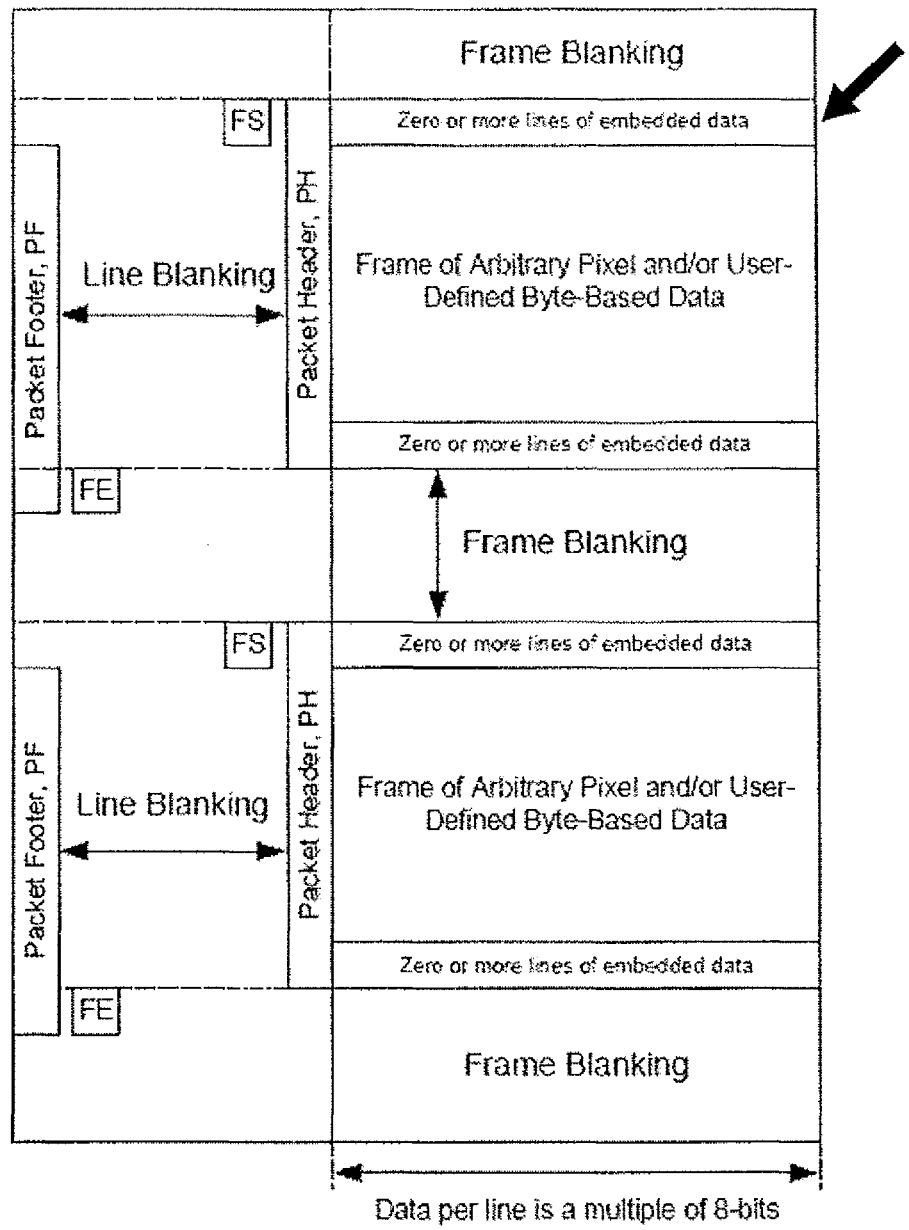

VIDEO TRANSMISSION APPARATUS AND VIDEO RECEPTION APPARATUS

TECHNICAL FIELD

The present disclosure relates to a video transmission apparatus and a video reception apparatus.

BACKGROUND ART

In recent years, an application for massively transmitting data having a large data amount is being expanded. A large load is easily applied to a transmission system, and in the worst case, there is the possibility that the transmission system fails and it becomes difficult to perform data transmission.

In the past, in order to avoid failure of the transmission system, for example, the entire photographed image has not been transmitted, an object to be photographed has been specified and only a portion of the image in which the specified object is cut out has been transmitted. In addition, cutting out a portion of an image from the photographed image is described, for example, in the after-mentioned PTL.

CITATION LIST

Patent Literature

[PTL 1]
  JP 2016-201756A
[PTL 2]
  JP 2014-39219A
[PTL 3]
  JP 2013-164834A
[PTL 4]
  JP 2012-209831A

SUMMARY

Technical Problem

In recent years, an increase in the transmission data amount resulting from making video data high-definition, reduction in a load of a signal processing apparatus that further receives and processes the above, and reduction in power consumption of the entire system are desired. Thus, it is desirable to provide a video transmission apparatus and a video reception apparatus capable of reducing the transmission data amount.

Solution to Problem

A video transmission apparatus according to an embodiment of the present disclosure includes a detection section, a generation section, and a transmission portion. The detection section detects a region of overlap in which two or more regions of interest are mutually overlapped with each other on the basis of a plurality of pieces of positional information on regions of interest in a captured image. The generation section generates transmission data including the plurality of pieces of positional information and a plurality of third images in which a second image is omitted from a plurality of first images so that the second image in the region of overlap is not included redundantly in the plurality of first images in the regions of interest. The transmission portion outputs the transmission data.

In the video transmission apparatus according to an embodiment of the present disclosure, the transmission data is generated including the plurality of pieces of positional information and a plurality of third images in which a second image is omitted from a plurality of first images so that the second image in the region of overlap is not included redundantly in the plurality of first images. Through this processing, as compared to a case in which the entire captured image is transmitted, the transmission data amount can be reduced, and further as compared to a case in which each image cut out from the captured image is transmitted as it is, the transmission data amount can be reduced.

A video reception apparatus according to an embodiment of the present disclosure includes a reception portion and an image processing portion. The reception portion receives transmission data including a plurality of third images and a plurality of pieces of positional information. The image processing portion generates one or a plurality of second images in regions of overlap on the basis of one or the plurality of third images in the plurality of received third images and one or a plurality of pieces of positional information on the regions of overlap obtained from the plurality of pieces of positional information in the plurality of pieces of received positional information. The image processing portion further generates a plurality of first images in regions of interest in a captured image on the basis of the plurality of received third images and one or the plurality of second images.

In the video reception apparatus according to an embodiment of the present disclosure, a plurality of first images in regions of interest in a captured image are generated on the basis of the plurality of third images included in the received transmission data and one or a plurality of second images in regions of overlap generated on the basis of the received transmission data. Through this processing, even if the entire captured image is not received, the first image in each region of interest to be imaged can be obtained. Further, even if each image cut out from the captured image is not received as it is, the first image in each region of interest to be imaged can be obtained. Thus, as compared to a case in which the entire captured image is transmitted, the transmission data amount can be reduced, and further as compared to a case in which each image cut out from the captured image is transmitted as it is, the transmission data amount can be reduced.

Advantageous Effects of Invention

In accordance with the video transmission apparatus according to an embodiment of the present disclosure, the transmission data is generated including the plurality of pieces of positional information and a plurality of third images in which a second image is omitted from a plurality of first images so that the second image in the region of overlap is not included redundantly in the plurality of first images, and therefore the transmission data amount can be reduced.

In accordance with the video reception apparatus according to an embodiment of the present disclosure, on the basis of the plurality of third images included in the received transmission data and one or the plurality of second images in the regions of overlap generated on the basis of the received transmission data, the plurality of first images in the regions of interest in the captured image are generated, and therefore the transmission data amount can be reduced.

An image transmission apparatus according to an embodiment of the present disclosure includes a detection circuitry, a generation circuitry, and a transmission circuitry. The detection circuitry is configured to detect an overlap region in a captured image that is shared by two or more regions of interest based on a plurality of pieces of positional information that defines the two or more regions of interest in the captured image. The generation circuitry is configured to generate a first image based on a first piece of positional information from the plurality of pieces of positional information, the first image including the overlap region, and the first image corresponding to a first region of interest of the two or more regions of interest. The generation circuitry is configured to generate one or more second images based on the overlap region and the plurality of pieces of positional information, the one or more second images excluding the overlap region, and the one or more second images corresponding to regions of interest other than the first region of interest of the two or more regions of interest. The generation circuitry is also configured to generate transmission data including the first image, the one or more second images, and the plurality of pieces of positional information. The transmission circuitry is configured to output the transmission data.

An image reception apparatus according to an embodiment of the present disclosure includes a reception circuitry and an image processing circuitry. The reception circuitry is configured to receive transmission data including a first image, one or more second images, and a plurality of pieces of positional information. The image processing circuitry is configured to generate a plurality of third images associated with two or more regions of interest in a captured image, the plurality of third images based on the first image, the one or more second images, and the plurality of pieces of positional information.

A system according to an embodiment of the present disclosure includes an image transmission apparatus and an image reception apparatus. The image transmission apparatus includes a detection circuitry, a generation circuitry, and a transmission circuitry. The detection circuitry is configured to detect an overlap region in a captured image that is shared by two or more regions of interest based on a plurality of pieces of positional information that defines the two or more regions of interest in the captured image. The generation circuitry is configured to generate a first image based on a first piece of positional information from the plurality of pieces of positional information, the first image including the overlap region, and the first image corresponding to a first region of interest of the two or more regions of interest. The generation circuitry is configured to generate one or more second images based on the overlap region and the plurality of pieces of positional information, the one or more second images excluding the overlap region, and the one or more second images corresponding to regions of interest other than the first region of interest of the two or more regions of interest. The generation circuitry is also configured to generate transmission data including the first image, the one or more second images, and the plurality of pieces of positional information. The transmission circuitry is configured to output the transmission data. The image reception apparatus includes a reception circuitry and an image processing circuitry. The reception circuitry is configured to receive the transmission data including the first image, the one or more second images, and the plurality of pieces of positional information. The image processing circuitry is configured to generate a plurality of third images associated with the two or more regions of interest in the captured image, the plurality of third images based on the first image, the one or more second images, and the plurality of pieces of positional information.

It is to be noted that the effects of the present disclosure are not necessarily limited to the effects described herein and may be any effects described in the present specification.

BRIEF DESCRIPTION OF DRAWINGS

FIG. 1 is a diagram illustrating a schematic configuration example of a video transmission system.

FIG. 2 is a diagram illustrating one example of a generation procedure of transmission data at the time when two ROIs (Region Of Interest) are included in a captured image in a video transmission apparatus in FIG. 1.

FIG. 3 is a diagram illustrating a configuration example of a frame in FIG. 2.

FIG. 4 is a diagram illustrating one example of a generation procedure of two ROI images included in the captured image at the time when two images are included in the transmission data in a video reception apparatus in FIG. 1.

FIG. 5 is a diagram illustrating one example of a generation procedure of the transmission data at the time when three ROIs are included in the captured image in the video transmission apparatus in FIG. 1.

FIG. 6 is a diagram illustrating one example of the generation procedure of the transmission data continuous to FIG. 5.

FIG. 7A is a diagram illustrating a configuration example of a frame in FIG. 6.

FIG. 7B is a diagram illustrating the configuration example of the frame in FIG. 6.

FIG. 8 is a diagram illustrating one example of a generation procedure of three ROI images included in the captured image at the time when three images are included in the transmission data in the video reception apparatus in FIG. 1.

FIG. 9 is a diagram illustrating one example of the captured image in which two ROIs are included.

FIG. 10 is a diagram illustrating a configuration example of a frame obtained at the time of generating the transmission data from the captured image in FIG. 9 in the video transmission apparatus in FIG. 1.

FIG. 11 is a diagram illustrating one modification example of the video transmission system in FIG. 1.

FIG. 12 is a diagram illustrating a configuration example of a frame obtained at the time of generating the transmission data from the captured image in FIG. 5 in the video transmission apparatus in FIG. 11.

FIG. 13 is a diagram illustrating the configuration example of the frame obtained at the time of generating the transmission data from the captured image in FIG. 5 in the video transmission apparatus in FIG. 11.

FIG. 14 is a diagram illustrating one modification example of the video transmission system in FIG. 1.

FIG. 15 is a diagram illustrating one modification example of the video transmission system in FIG. 1.

FIG. 16 is a diagram illustrating one example of an outline of a packet in a low-level protocol regulated by an MIPI (Mobile Industry Processor Interface) (registered trademark) standard.

FIG. 17 is a diagram illustrating one example of a frame format regulated by the MIPI standard.

DESCRIPTION OF EMBODIMENTS

Hereinafter, modes for carrying out the present disclosure will be described in detail with reference to the accompanying drawings. The following description is one specific example of the present disclosure and the present disclosure is not limited to the following aspects.

EMBODIMENT

Configuration

A video transmission system 1 including a video transmission apparatus and a video reception apparatus according to one embodiment of the present disclosure will be described. FIG. 1 illustrates a schematic configuration example of the video transmission system 1. The video transmission system 1 includes a video transmission apparatus 100 and a video reception apparatus 200 connected to each other via a transmission path 300. The video transmission apparatus 100 and the video reception apparatus 200 may also be referred to as an image transmission apparatus and an image reception apparatus, respectively. The video transmission system 1 transmits transmission data 120A generated by performing predetermined processing to a captured image 111 from the video transmission apparatus 100 to the video reception apparatus 200 via the transmission path 300. FIG. 2 illustrates one example of a generation procedure of the transmission data 120A.

The transmission path 300 is, for example, a network for performing communication by using a communication protocol (TCP/IP) used in the Internet on the standard scale. The transmission path 300 may be, for example, a secure network for performing communication by using the communication protocol of its unique network. The transmission path 300 is, for example, the Internet, an intranet, or a local area network. In a connection between the transmission path 300 and the video transmission apparatus 100 as well as the video reception apparatus 200, for example, a wired LAN (Local Area Network) may be used, or a portable telephone line, a wireless LAN such as a Wi-Fi, or the like may be used. The transmission path 300 may also be an electrical connection, for example, one or more wires on a printed circuit board. The transmission path 300 may also be a non-electrical connection, for example, one or more optical fiber cables.

(Video Transmission Apparatus 100)

The video transmission apparatus 100 includes, for example, an imaging portion 110, an image processing portion 120, and a transmission portion 130. The imaging portion 110 converts, for example, optical image signals obtained through an optical lens or the like into image data. The imaging portion 110 has an analog-to-digital conversion circuit and converts analog image data into digital image data. A data format after the conversion may be a YCbCr format in which a color of each pixel is expressed by using a luminance component Y and a color difference component Cb and Cr, or may be an RGB format or the like. The imaging portion 110 outputs the captured image 111 (digital image data) obtained by the imaging to the image processing portion 120.

The image processing portion 120 performs predetermined processing to the captured image 111 input from the imaging portion 110, and thereby generates the transmission data 120A and outputs the transmission data 120A to the transmission portion 130. The transmission portion 130 transmits the input transmission data 120A to the video reception apparatus 200 via the transmission path 300. The image processing portion 120 includes, for example, an ROI cutting-out section 121, an ROI analysis section 122, an overlapping detection section 123, a priority setting section 124, and an encoding section 125.

The ROI cutting-out section 121 specifies one or a plurality of objects to be photographed included in the captured image 111 input from the imaging portion 110 and sets a region of interest ROI for each specified object. The region of interest ROI is, for example, a rectangular region including the specified object. The ROI cutting-out section 121 cuts out an image (ROI image 112) in each region of interest ROI from the captured image 111. The ROI cutting-out section 121 further gives a region number as an identifier to each set region of interest ROI. In the captured image 111, for example, when setting two regions of interest ROI, the ROI cutting-out section 121 gives a region number 1 to one region of interest ROI (for example, a region of interest ROI 1 in FIG. 2) and gives a region number 2 to the other region of interest ROI (for example, a region of interest ROI 2 in FIG. 2). The ROI cutting-out section 121 stores, for example, the given identifiers (region numbers) in a storage section. The ROI cutting-out section 121 stores, for example, each ROI image 112 cut out from the captured image 111 in the storage section. The ROI cutting-out section 121 further stores, for example, the identifiers (region numbers) given to each region of interest ROI in the storage section while associating the identifiers with the ROI images 112.

The ROI analysis section 122 derives, for each region of interest ROI, positional information 113 on the regions of interest ROI in the captured image 111. The positional information 113 includes, for example, left upper end coordinates (Xa, Ya) of the regions of interest ROI, a length in the X axis direction of the regions of interest ROI, and a length in the Y axis direction of the regions of interest ROI. The length in the X axis direction of the region of interest ROI is, for example, a physical region length XLa in the X axis direction of the region of interest ROI. The length in the Y axis direction of the region of interest ROI is, for example, a physical region length YLa in the Y axis direction of the region of interest ROI. The physical region length indicates a physical length of the region of interest ROI. In the positional information 113, coordinates of positions different from those of the left upper end of the region of interest ROI may be included. The ROI analysis section 122 associates, for example, the derived positional information 113 with the identifiers (region numbers) given to the regions of interest ROI and stores the derived positional information 113 in the storage section.

For each region of interest ROI, as the positional information 113, the ROI analysis section 122 may further derive, for example, an output region length XLc in the X axis direction of the region of interest ROI or an output region length YLc in the Y axis direction of the region of interest ROI. The output region length is, for example, a length of the region of interest ROI after a change in a resolution is performed by using a thinning process, a pixel addition, or the like to the region of interest ROI. For each region of interest ROI, in addition to the positional information 113, the ROI analysis section 122 may derive, for example, sensing information, exposure information, gain information, AD (Analog-Digital) word length, or the like. The sensing information indicates contents of an arithmetic operation relating to objects included in the region of interest ROI, supplementary information for post-stage signal processing to the ROI image 112, or the like. The exposure information indicates an exposure time of the region of interest ROI. The gain information indicates gain information on the region of interest ROI. The AD word length indicates a word length of data per AD-converted pixel in the region of interest ROI.

When a plurality of objects to be photographed are specified in the captured image 111, the overlapping detection section 123 detects a region of overlap (ROO (Region Of Overlap)) in which two or more regions of interest ROI are mutually overlapped with each other on the basis of a plurality of pieces of positional information 113 on the regions of interest ROI in the captured image 111. That is, for each region of overlap ROO, the overlapping detection section 123 derives positional information 114 on the region of overlap ROO in the captured image 111. The region of overlap ROO is, for example, a rectangular region that has the same size as that of a smallest region of interest ROI or that is smaller than the smallest region of interest ROI in two or more regions of interest ROI that are overlapped with each other. The positional information 114 includes, for example, left upper end coordinates (Xb, Yb) of the region of overlap ROO, a length in the X axis direction of the region of overlap ROO, and a length in the Y axis direction of the region of overlap ROO. The length in the X axis direction of the region of overlap ROO is, for example, a physical region length XLb. The length in the Y axis direction of the region of overlap ROO is, for example, a physical region length YLb. In the positional information 114, coordinates of positions different from those in the left upper end in the region of interest ROI may be included.

The priority setting section 124 gives a priority 115 to each region of interest ROI in the captured image 111. In addition to the region number given to each region of interest ROI, the priority setting section 124 may give the priority 115 to each region of interest ROI or substitute the region number given to each region of interest ROI for the priority 115.

The priority 115 is the identifier of each region of interest ROI and is discrimination information capable of discriminating whether omission of the region of overlap ROO is performed to any of a plurality of region of interest ROI in the captured image 111. In two regions of interest ROI each including the region of overlap ROO, for example, the priority setting section 124 gives 1 as the priority 115 to one region of interest ROI and gives 2 as the priority 115 to the other region of interest ROI. In this case, when creating the after-mentioned transmission image 116, the omission of the region of overlap ROO is performed to the region of interest ROI in which a value of the priority 115 is larger. In addition, the priority setting section 124 may give to the region of interest ROI, as the priority 115, the same number as the region number given to each region of interest ROI. The priority setting section 124 associates, for example, the priority 115 given to each region of interest ROI with the ROI image 112 and stores the priority 115 in the storage section.

The encoding section 125 encodes each transmission image 116 and generates compressed image data. As a format of the compressed image data, for example, the encoding section 125 compresses each transmission image 116 by using a compression format or the like based on a JPEG (Joint Photographic Experts Group) standard. Before performing the above-mentioned compression processing, the encoding section 125 generates each transmission image 116. The encoding section 125 generates the transmission data 120A including a plurality of transmission images 116 (third images) in which an image 118 is omitted from a plurality of ROI images 112 obtained from the captured image 111 and the plurality of pieces of positional information 113 so that the image 118 (second image) in the region of overlap ROO is not included redundantly in the plurality of ROI images 112 (first images) obtained from the captured image 111.

On the basis of the priority 115 given to each region of interest ROI, for example, the encoding section 125 determines whether the omission of the image 118 is performed to any of the plurality of ROI images 112. In addition, for example, the encoding section 125 may use, as the priority 115, the region number given to each region of interest ROI and thereby determine whether the omission of the image 118 is performed to any of the plurality of ROI images 112. The encoding section 125 uses the ROI image 112 obtained by omitting the image 118 in the ROI images 112 specified as described above as the transmission image 116 (for example, transmission image 116a2 in FIG. 2). The encoding section 125 uses the ROI image 112 itself as the transmission image 116 (for example, transmission image 116a1 in FIG. 2) relating to the ROI image 112 not including the region of overlap ROO or the ROI image 112 in which the image 118 is not omitted on the basis of the above-mentioned determination.

The encoding section 125 further generates a frame 117 in which the plurality of pieces of positional information 113 and the plurality of transmission images 116 are associated with each other. At this time, the encoding section 125 further generates the transmission data 120A including the frame 117. FIG. 3 illustrates a configuration example of the frame 117. The frame 117 includes, for example, a header region R1, a packet region R2, and a footer region R3.

In the header region R1, for example, a frame number as the identifier of the frame 117 is included. The header region R1 includes information on each transmission image 116 included in the packet region R2. The header region R1 includes, for example, the number of the transmission images 116 (the number of ROIs) included in the packet region R2 and the positional information 113 (ROI information) on the ROI image 112 corresponding to each transmission image 116 included in the packet region R2. In the footer region R3, for example, information and the like on similar contents to those of information described in the header region R1 are included.

In the packet region R2 of the frame 117, for example, the encoding section 125 separates and arranges each transmission image 116 for each pixel row of the transmission image 116. Thus, in the packet region R2 of the frame 117, the image 118 in the region of overlap ROO is not included redundantly. In the packet region R2 of the frame 117, for example, the encoding section 125 further omits the pixel row that does not correspond to each transmission image 116 in the captured image 111. Thus, in the packet region R2 of the frame 117, the pixel row that does not correspond to each transmission image 116 in the captured images 111 is not included. It is to be noted that, in the packet region R2 in FIG. 3, a place surrounded by a broken line corresponds to the image 118 in the region of overlap ROO. In addition, in the packet region R2 of the frame 117, for example, the encoding section 125 may separate and arrange each transmission image 116 for each predetermined area of the transmission image 116.

In the packet region R2 of the frame 117, for example, the encoding section 125 provides a packet head for each pixel row and describes, for example, the region number (or the priority 115) of the ROI image 112 corresponding to the transmission image 116 included in the corresponding pixel row in the packet head. In the packet region R2 in FIG. 3, a surrounding portion on the left end is the packet head. In a certain pixel row, for example, in a case where the transmission image 116 in which the region number (or the priority 115) is 1 is included, 1 is described in the packet head. Further, in a certain pixel row, for example, in a case where the transmission image 116 in which the region number (or the priority 115) is 1 and the transmission image 116 in which the region number (or the priority 115) is 2 are included, 1, 2 are described in the packet head.

It is to be noted that, in the case in which 1, 2 are described in the packet head, this means that a packet group (for example, 1(n) in FIG. 3) close to the packet head is packets of the transmission image 116 in which the region number (or the priority 115) is 1; further, a packet group (for example, 2(1) in FIG. 3) separate from the packet head is packets of the transmission image 116 in which the region number (or the priority 115) is 2. A boundary between the packet group (for example, 1(n) in FIG. 3) close to the packet head and the packet group (for example, 2(1) in FIG. 3) separate from the packet head is specified by the physical region length XLa1 of the ROI image 112 corresponding to the transmission image 116 of the packet group (for example, 1(n) in FIG. 3) close to the packet head. In the image 118 in the region of overlap ROO included in the packet group (for example, 1(n) in FIG. 3) close to the packet head, a starting position of the packet is specified by the physical region length XLa2 of the ROI image 112 corresponding to the packet group (for example, 2(1) in FIG. 3) separate from the packet head.

(Video Reception Apparatus 200)

Subsequently, the video reception apparatus 200 will be described. FIG. 4 illustrates one example of the generation procedure of an ROI image 119 in the video reception apparatus 200. The video reception apparatus 200 includes, for example, a reception portion 210 and an image processing portion 220. The reception portion 210 receives the transmission data 120A output from the video transmission apparatus 100 via the transmission path 300. The reception portion 210 outputs the received transmission data 120A to the image processing portion 220. The image processing portion 220 includes, for example, a decoding section 221, an information extraction section 222, and an ROI image generation section 223.

The decoding section 221 decodes the transmission data 120A and generates the plurality of transmission images 116 and the plurality of pieces of positional information 113. From among the plurality of pieces of positional information 113 obtained by the decoding, for example, the information extraction section 222 extracts the coordinates (for example, the left upper end coordinates), the length (for example, the physical region length), and the region number (or the priority 115) of the region of interest ROI corresponding to each transmission image 116. That is, the transmission data 120A includes the region number (or the priority 115) of the region of interest ROI corresponding to each transmission image 116 as the discrimination information capable of discriminating whether the omission of the image 118 in the region of overlap ROO is performed to any of the plurality of transmission images 116 included in the transmission data 120A.

By the decoding of the transmission data 120A, for example, two transmission images 116 are assumed to be generated. At this time, the information extraction section 222 extracts the coordinates (for example, the left upper end coordinates (Xa1, Ya1)), the length (for example, the physical region length XLa1, YLa1), and the region number 1 (or the priority 115 (=1)) of the region of interest ROI corresponding to one transmission image 116 (116a1). The information extraction section 222 further extracts the coordinates (for example, the left upper end coordinates (Xa2, Ya2)), the length (for example, the physical region length XLa2, YLa2), and the region number 2 (or the priority 115 (=2)) of the region of interest ROI corresponding to the other transmission image 116 (116a2).

The ROI image generation section 223 generates one or a plurality of images 118 in the region of overlap ROO on the basis of one or the plurality of transmission images 116 in the plurality of received transmission images 116 and one or the plurality of pieces of positional information 114 on the region of overlap ROO obtained from the plurality of pieces of positional information 113 in the plurality of pieces of received positional information 113.

By the decoding of the transmission data 120A, for example, the two transmission images 116 and two pieces of positional information 113 are assumed to be generated. At this time, the ROI image generation section 223 derives the positional information 114 on the region of overlap ROO on the basis of the coordinates (for example, the left upper end coordinates (Xa1, Ya1)) and the length (for example, the physical region length XLa1, YLa1) of the region of interest ROI corresponding to one transmission image 116 (116a1) and the coordinates (for example, the left upper end coordinates (Xa2, Ya2)) and the length (for example, the physical region length XLa2, YLa2) of the region of interest ROI corresponding to the other transmission image 116 (116a2). As the above-mentioned positional information 114 on the region of overlap ROO, for example, the ROI image generation section 223 derives the coordinates (for example, the left upper end coordinates (Xb1, Yb1)) and the length (for example, the physical region length XLb1, YLb1) of the region of overlap ROO. The ROI image generation section 223 determines whether or not the derived positional information 114 is included in any of the two transmission images 116. As a result, in a case where the derived positional information 114 is included in the transmission image 116 (116a1), the ROI image generation section 223 cuts out an image in a region corresponding to the derived positional information 114 from the transmission image 116 (116a1) and obtains the image 118 in the region of overlap ROO.

The ROI image generation section 223 further generates the plurality of images (ROI images 112) in the region of interest ROI in the captured image 111 on the basis of the plurality of transmission images 116 read out from the transmission data 120A and one or the plurality of images 118 in the region of overlap ROO. The ROI image generation section 223 uses, for example, the region number (or the priority 115) read out from the transmission data 120A, and thereby determines whether the images 118 in the region of overlap ROO are added to any of the plurality of transmission images 116 included in the transmission data 120A. The ROI image generation section 223 adds, for example, the images 118 in the region of overlap ROO to the transmission images 116 (for example, the transmission image 116a2 in FIG. 4) in which the region number (or the priority 115) is largest, and thereby generates the ROI image 119 (for example, the ROI image 119a2 in FIG. 4). The ROI image generation section 223 uses, for example, the transmission image 116 itself as the ROI image 119 (for example, the ROI image 119a1 in FIG. 4) in relation to the transmission images 116 not including the region of overlap ROO or the transmission images 116 to which the images 118 are not added in accordance with the above-mentioned determination. It is to be noted that the plurality of pieces of positional information 113 received by the reception portion 210 correspond to a plurality of pieces of positional information on the ROI images 119 obtained as described above, and correspond to a plurality of pieces of positional information on the ROI images 112 in the captured image 111. Thus, a plurality of ROI images 119 obtained as described above are equivalent to the plurality of ROI images 112 in the captured image 111.

Procedure

Subsequently, one example of a procedure of data transmission in the video transmission system 1 will be described with reference to FIGS. 2 and 4.

First, the imaging portion 110 outputs the captured image 111 (digital image data) obtained by the imaging to the image processing portion 120. The ROI cutting-out section 121 specifies two regions of interest ROI 1 and ROI 2 included in the captured image 111 input from the imaging portion 110. The ROI cutting-out section 121 cuts out images (ROI images 112a1 and 112a2) in each of the regions of interest ROI 1 and ROI 2 from the captured image 111. The ROI cutting-out section 121 gives the region number 1 as the identifier to the region of interest ROI 1 and gives the region number 2 as the identifier to the region of interest ROI 2.

The ROI analysis section 122 derives the positional information 113 on the region of interest ROI in the captured image 111 for each region of interest ROI. On the basis of the region of interest ROI 1, the ROI analysis section 122 derives the left upper end coordinates (Xa1, Ya1) of the region of interest ROI 1, a length (XLa1) in the X axis direction of the region of interest ROI 1, and a length (YLa1) in the Y axis direction of the region of interest ROI 1. On the basis of the region of interest ROI 2, the ROI analysis section 122 derives the left upper end coordinates (Xa2, Ya2) of the region of interest ROI 2, a length (XLa2) in the X axis direction of the region of interest ROI 2, and a length (YLa2) in the Y axis direction of the region of interest ROI 2.

On the basis of the positional information 113 on the two regions of interest ROI 1 and ROI 2 in the captured image 111, the overlapping detection section 123 detects the region of overlap ROO in which both of the two regions of interest ROI 1 and ROI 2 are overlapped with each other. That is, the overlapping detection section 123 derives the positional information 114 on the region of overlap ROO in the captured image 111. As the positional information 114 on the region of overlap ROO in the captured image 111, the overlapping detection section 123 derives the left upper end coordinates (Xb1, Yb1) of the region of overlap ROO, the length (XLb1) in the X axis direction of the region of overlap ROO, and the length (YLb1) in the Y axis direction of the region of overlap ROO.

In the two regions of interest ROI 1 and ROI 2, the priority setting section 124 gives 1 as the priority 115 to one region of interest ROI 1 and gives 2 as the priority 115 to the other region of interest ROI 2.

The encoding section 125 generates the transmission data 120A including two transmission images 116a1 and 116a2 obtained by omitting the image 118 from the two ROI images 112a1 and 112a2 obtained from the captured image 111 and the two pieces of positional information 113 on the regions of interest ROI 1 and ROI 2 so that the image 118 in the region of overlap ROO is not included redundantly in the two regions of interest ROI 1 and ROI 2.

On the basis of the region numbers (or the priorities 115) of the two regions of interest ROI 1 and ROI 2, the encoding section 125 determines whether the omission of the image 118 is performed to any of the two ROI images 112a1 and 112a2. In the two regions of interest ROI 1 and ROI 2, the encoding section 125 performs the omission of the image 118 to the ROI image 112a2 corresponding to the region of interest ROI 2 in which the region number (or the priority 115) is larger, and thereby generates the transmission image 116a2. In the two regions of interest ROI 1 and ROI 2, the encoding section 125 uses the ROI image 112a1 itself as the transmission image 116a1 in relation to the ROI image 112a1 corresponding to the region of interest ROI 1 in which the region number (or the priority 115) is smaller.

The encoding section 125 further generates the frame 117 in which the two pieces of positional information 113 on the regions of interest ROI 1 and ROI 2 and the two transmission images 116a1 and 116a2 are associated with each other. The encoding section 125 further generates the transmission data 120A including the generated frame 117 and transmits the transmission data 120A to the video reception apparatus 200 via the transmission path 300.

The reception portion 210 receives the transmission data 120A output from the video transmission apparatus 100 via the transmission path 300. The reception portion 210 outputs the received transmission data 120A to the image processing portion 220. The decoding section 221 decodes the transmission data 120A and generates the two transmission images 116a1 and 116a2 and the two pieces of positional information 113 on the regions of interest ROI 1 and ROI 2. The information extraction section 222 extracts the coordinates (for example, the left upper end coordinates (Xa1, Ya1)), the length (for example, the physical region length XLa1, YLa1), and the region number 1 (or the priority 115 (=1)) of the region of interest ROI corresponding to the transmission image 116a1. The information extraction section 222 further extracts the coordinates (for example, the left upper end coordinates (Xa2, Ya2)), the length (for example, the physical region length XLa2, YLa2), and the region number 2 (or the priority 115 (=2)) of the region of interest ROI corresponding to the transmission image 116a2.

On the basis of the two received transmission images 116a1 and 116a2 and the positional information on the region of overlap ROO obtained from the two pieces of received positional information 113, the ROI image generation section 223 generates the image 118 in the region of overlap ROO.

The ROI image generation section 223 derives the positional information 114 on the region of overlap ROO on the basis of the coordinates (the left upper end coordinates (Xa1, Ya1)) and the length (the physical region length XLa1, YLa1) of the region of interest ROI corresponding to the transmission image 116a1 and the coordinates (the left upper end coordinates (Xa2, Ya2)) and the length (the physical region length XLa2, YLa2) of the region of interest ROI corresponding to the transmission image 116a2. As the above-mentioned positional information 114 on the region of overlap ROO, for example, the ROI image generation section 223 derives the coordinates (the left upper end coordinates (Xb1, Yb1)) and the length (the physical region length XLb1, YLb1) of the region of overlap ROO. The ROI image generation section 223 determines whether or not the derived positional information 114 is included in any of the two transmission images 116. As a result, since the derived positional information 114 is included in the transmission image 116a1, the ROI image generation section 223 cuts out an image in a region corresponding to the derived positional information 114 from the transmission image 116a1 and obtains the image 118 in the region of overlap ROO.

The ROI image generation section 223 further generates two images (the ROI images 112a1 and 112a2) in the regions of interest ROI in the captured image 111 on the basis of the two transmission images 116a1 and 116a2 read out from the transmission data 120A and one or the plurality of images 118 in the region of overlap ROO. The ROI image generation section 223 uses the region number (or the priority 115) read out from the transmission data 120A, and thereby determines whether the images 118 in the region of overlap ROO are added to any of the two transmission images 116a1 and 116a2 included in the transmission data 120A.

The ROI image generation section 223 adds the images 118 in the region of overlap ROO to the transmission image 116a2 in which the region number (or the priority 115) is largest, and thereby generates the ROI image 119a2. The ROI image generation section 223 uses the transmission image 116a1 itself as the ROI image 119a1 in relation to the transmission image 116a1 to which the images 118 are not added. It is to be noted that two pieces of positional information 113 received by the reception portion 210 correspond to two pieces of positional information on the ROI images 119a1 and 119a2 obtained as described above, and correspond to two pieces of positional information 113 on the ROI images 112a1 and 112a2 in the captured image 111. Thus, a plurality of ROI images 119a1 and 119a2 obtained as described above are equivalent to the two ROI images 112a1 and 112a2 in the captured image 111.

So far, the generation procedure of the transmission data 120A has been exemplified at the time when two ROI images 112 are included in the captured image 111 in the video transmission apparatus 100. Also, the generation procedure of two ROI images 112 included in the captured image 111 has been exemplified at the time when two images (the transmission images 116) are included in the transmission data 120A in the video reception apparatus 200. Hereinafter, there will be described the generation procedure example of the transmission data 120A at the time when three ROI images 112 are included in the captured image 111 in the video transmission apparatus 100 and the generation procedure example of three ROI images 112 included in the captured image 111 at the time when three images (the transmission images 116) are included in the transmission data 120A in the video reception apparatus 200.

Subsequently, one example of a procedure of the data transmission in the video transmission system 1 will be described with reference to FIGS. 5, 6, 7A, 7B, and 8. FIGS. 5 and 6 illustrate one example of the generation procedure of the transmission data 120A at the time when three ROI images 112 (112a4, 112a5, and 112a6) are included in the captured image 111 in the video transmission apparatus 100. FIGS. 7A and 7B illustrate a configuration example of the frame 117 in FIG. 6. FIG. 8 illustrates one example of the generation procedure of three ROI images 112 (112a4, 112a5, and 112a6) included in the captured image 111 at the time when three transmission images 116a4, 116a5, and 116a6 are included in the transmission data 120A in the video reception apparatus 200.

First, the imaging portion 110 outputs the captured image 111 (digital image data) obtained by the imaging to the image processing portion 120. The ROI cutting-out section 121 specifies three regions of interest ROI 4, ROI 5, and ROI 6 included in the captured image 111 input from the imaging portion 110. The ROI cutting-out section 121 cuts out images (ROI images 112a4, 112a5, and 112a6) in each of the regions of interest ROI 4, ROI 5, and ROI 6 from the captured image 111. The ROI cutting-out section 121 gives the region number 1 as the identifier to the region of interest ROI 4, gives the region number 2 as the identifier to the region of interest ROI 5, and gives the region number 3 as the identifier to the region of interest ROI 6.

The ROI analysis section 122 derives positional information 113 on the regions of interest ROI in the captured image 111 for each region of interest ROI. On the basis of the region of interest ROI 4, the ROI analysis section 122 derives the left upper end coordinates (Xa4, Ya4) of the region of interest ROI 1, a length (XLa4) in the X axis direction of the region of interest ROI 4, and a length (YLa4) in the Y axis direction of the region of interest ROI 4. On the basis of the region of interest ROI 5, the ROI analysis section 122 derives the left upper end coordinates (Xa5, Ya5) of the region of interest ROI 5, a length (XLa5) in the X axis direction of the region of interest ROI 5, and a length (YLa5) in the Y axis direction of the region of interest ROI 5. On the basis of the region of interest ROI 6, the ROI analysis section 122 derives the left upper end coordinates (Xa6, Ya6) of the region of interest ROI 6, a length (XLa6) in the X axis direction of the region of interest ROI 6, and a length (YLa6) in the Y axis direction of the region of interest ROI 6.

On the basis of the positional information 113 on the three regions of interest ROI 4, ROI 5, and ROI 6 in the captured image 111, the overlapping detection section 123 detects the regions of overlap ROO 1, ROO 2, and ROO 3 in which two of the three regions of interest ROI 4, ROI 5, and ROI 6 are overlapped with each other. That is, the overlapping detection section 123 derives the positional information 114 on the regions of overlap ROO 1, ROO 2, and ROO 3 in the captured image 111. The region of overlap ROO 1 is a region in which the region of interest ROI 4 and the region of interest ROI 5 are overlapped with each other. The region of overlap ROO 2 is a region in which the region of interest ROI 4 and the region of interest ROI 6 are overlapped with each other. The region of overlap ROO 3 is a region in which the region of interest ROI 5 and the region of interest ROI 6 are overlapped with each other. As the positional information 114 on the region of overlap ROO 1 in the captured image 111, the overlapping detection section 123 derives the left upper end coordinates (Xb2, Yb2) of the region of overlap ROO 1, the length (XLb2) in the X axis direction of the region of overlap ROO 1, and the length (YLb2) in the Y axis direction of the region of overlap ROO 1. As the positional information 114 on the region of overlap ROO 2 in the captured image 111, the overlapping detection section 123 derives the left upper end coordinates (Xb3, Yb3) of the region of overlap ROO 2, the length (XLb3) in the X axis direction of the region of overlap ROO 2, and the length (YLb3) in the Y axis direction of the region of overlap ROO 2. As the positional information 114 on the region of overlap ROO 3 in the captured image 111, the overlapping detection section 123 derives the left upper end coordinates (Xb4, Yb4) of the region of overlap ROO 3, the length (XLb4) in the X axis direction of the region of overlap ROO 3, and the length (YLb4) in the Y axis direction of the region of overlap ROO 3.

In three regions of interest ROI 4, ROI 5, and ROI 6, the priority setting section 124 gives 1 as the priority 115 to a first region of interest ROI 4, gives 2 as the priority 115 to a second region of interest ROI 5, and gives 3 as the priority 115 to a third region of interest ROI 6.

The encoding section 125 generates the transmission data 120A including the three transmission images 116a4, 116a5, and 116a6 in which the image 118 is omitted from three ROI images 112a4, 112a5, and 112a6 obtained from the captured image 111, and three pieces of positional information 113 on the regions of interest ROI 4, ROI 5, and ROI 6 so that the images 118 in the regions of overlap ROO 1, ROO 2, and ROO 3 are not included redundantly in three regions of interest ROI 4, ROI 5, and ROI 6.

On the basis of the region numbers (or the priorities 115) of the two regions of interest ROI 4 and ROI 5, the encoding section 125 determines whether the omission of the image 118 in the region of overlap ROO 1 is performed to any of two ROI images 112a4 and 112a5. In the two regions of interest ROI 4 and ROI 5, the encoding section 125 performs the omission of the image 118 in the region of overlap ROO 1 to the ROI image 112a5 corresponding to the region of interest ROI 5 in which the region number (or the priority 115) is larger, and thereby generates the transmission image 116a5.

On the basis of the region numbers (or the priorities 115) of the two regions of interest ROI 5 and ROI 6, the encoding section 125 determines whether the omission of the image 118 in the region of overlap ROO 3 is performed to any of two ROI images 112a5 and 112a6. In the two regions of interest ROI 5 and ROI 6, the encoding section 125 performs the omission of the image 118 in the region of overlap ROO 3 to the ROI image 112a6 corresponding to the region of interest ROI 6 in which the region number (or the priority 115) is larger. On the basis of the region numbers (or the priorities 115) of the two regions of interest ROI 4 and ROI 6, the encoding section 125 further determines whether the omission of the image 118 in the region of overlap ROO 2 is performed to any of two ROI images 112a4 and 112a6. In the two regions of interest ROI 4 and ROI 6, the encoding section 125 performs the omission of the image 118 in the region of overlap ROO 2 to the ROI image 112a6 corresponding to the region of interest ROI 6 in which the region number (or the priority 115) is larger. As described above, the encoding section 125 generates the transmission image 116a6.

The encoding section 125 further generates the frame 117 in which the positional information 113 on the three regions of interest ROI 4, ROI 5, and ROI 6 and the three transmission images 116a4, 116a5, and 116a6 are associated with each other. The encoding section 125 further generates the transmission data 120A including the generated frame 117 and transmits the transmission data 120A to the video reception apparatus 200 via the transmission path 300.

As illustrated in FIGS. 7A and 7B, for example, the frame 117 includes the header region R1, the packet region R2, and the footer region R3.

In the header region R1, for example, the frame number as the identifier of the frame 117 is included. The header region R1 includes information on each transmission image 116 included in the packet region R2. The header region R1 includes, for example, the number of the transmission images 116 (the number of ROIs) included in the packet region R2 and the positional information 113 (ROI information) on the ROI image 112 corresponding to each transmission image 116 included in the packet region R2. In the footer region R3, for example, information and the like on similar contents to those of the header region R1 are included.

In the packet region R2 of the frame 117, for example, the encoding section 125 separates and arranges each transmission image 116 for each pixel row of the transmission image 116. Thus, in the packet region R2 of the frame 117, the images 118 in the regions of overlap ROO 1, ROO 2, and ROO 3 are not included redundantly. In the packet region R2 of the frame 117, for example, the encoding section 125 further omits the pixel row that does not correspond to each transmission image 116 in the captured image 111. Thus, in the packet region R2 of the frame 117, the pixel row that does not correspond to each transmission image 116 in the captured image 111 is not included. It is to be noted that, in the packet region R2 in FIG. 7B, a place surrounded by a broken line corresponds to the images 118 in the regions of overlap ROO 1, ROO 2, and ROO 3.

In the packet region R2 of the frame 117, the encoding section 125 provides, for example, the packet head for each pixel row and describes, for example, in the packet head, the region number (or the priority 115) of the ROI image 112 corresponding to the transmission image 116 included in the corresponding pixel row. In the packet region R2 in FIG. 7B, a surrounding portion on the left end is the packet head. In a certain pixel row, for example, in a case where the transmission image 116 is included in which the region number (or the priority 115) is 4, 4 is described in the packet head. Further, in a certain pixel row, for example, in a case where there are included the transmission image 116 in which the region number (or the priority 115) is 4 and the transmission image 116 in which the region number (or the priority 115) is 5, 4, 5 or 5, 4 are described in the packet head. Further, in a certain pixel row, for example, in a case where the transmission image 116 in which the region number (or the priority 115) is 5 and the transmission image 116 in which the region number (or the priority 115) is 6 are included, 5, 6 or 6, 5 are described in the packet head.

It is to be noted that, when 4, 5 are described in the packet head, this means that the packet group (for example, 4(i) in FIG. 7B) close to the packet head is packets of the transmission image 116 in which the region number (or the priority 115) is 4; further, the packet group (for example, 5(1) in FIG. 7B) separate from the packet head is packets of the transmission image 116 in which the region number (or the priority 115) is 5. A boundary between the packet group (for example, 4(i) in FIG. 7B) close to the packet head and the packet group (for example, 5(1) in FIG. 7B) separate from the packet head is specified by the physical region length XLa4 of the ROI image 112 corresponding to the transmission image 116 of the packet group (for example, 4(i) in FIG. 7B) close to the packet head. In the image 118 in the region of overlap ROO 1 included in the packet group (for example, 4(i) in FIG. 7B) close to the packet head, a starting position of the packet is specified by the physical region length XLa5 of the ROI image 112 corresponding to the packet group (for example, 5(1) in FIG. 7B) separate from the packet head.

The reception portion 210 receives the transmission data 120A output from the video transmission apparatus 100 via the transmission path 300. The reception portion 210 outputs the received transmission data 120A to the image processing portion 220. The decoding section 221 decodes the transmission data 120A and generates the three transmission images 116a4, 116a5, and 116a6 and the three pieces of positional information 113 on the regions of interest ROI 4, ROI 5, and ROI 6. The information extraction section 222 extracts the coordinates (for example, the left upper end coordinates (Xa4, Ya4)), the length (for example, the physical region length XLa4, YLa4), and the region number 4 (or the priority 115) of the region of interest ROI corresponding to the transmission image 116a4. The information extraction section 222 further extracts the coordinates (for example, the left upper end coordinates (Xa5, Ya5)), the length (for example, the physical region length XLa5, YLa5), and the region number 5 (or the priority 115) of the region of interest ROI corresponding to the transmission image 116a5. The information extraction section 222 further extracts the coordinates (for example, the left upper end coordinates (Xa6, Ya6)), the length (for example, the physical region length XLa6, YLa6), and the region number 6 (or the priority 115) of the region of interest ROI corresponding to the transmission image 116a6.

The ROI image generation section 223 generates the images 118 in the regions of overlap ROO 1, ROO 2, and ROO 3 on the basis of three received transmission images 116a4, 116a5, and 116a6 and the positional information 114 on the regions of overlap ROO 1, ROO 2, and ROO 3 obtained from three pieces of received positional information 113. At this time, the ROI image generation section 223 gathers the image 118 in the region of overlap ROO 2 and the image 118 in the region of overlap ROO 3 into one image 118b1. The ROI image generation section 223 further gathers the image 118 in the region of overlap ROO 1 and the image 118 in the region of overlap ROO 3 into one image 118b2.

The ROI image generation section 223 derives the positional information 114 on the region of overlap ROO 1 on the basis of the coordinates (the left upper end coordinates (Xa4, Ya4)) and the length (the physical region length XLa4, YLa4) of the region of interest ROI corresponding to the transmission image 116a4 and the coordinates (the left upper end coordinates (Xa5, Ya5)) and the length (the physical region length XLa5, YLa5) of the region of interest ROI corresponding to the transmission image 116a5. As the above-mentioned positional information 114 on the region of overlap ROO 1, for example, the ROI image generation section 223 derives the coordinates (the left upper end coordinates (Xb2, Yb2)) and the length (the physical region length XLb2, YLb2) of the region of overlap ROO 1.

The ROI image generation section 223 derives the positional information 114 on the region of overlap ROO 3 on the basis of the coordinates (the left upper end coordinates (Xa5, Ya5)) and the length (the physical region length XLa5, YLa5) of the region of interest ROI corresponding to the transmission image 116a5 and the coordinates (the left upper end coordinates (Xa6, Ya6)) and the length (the physical region length XLa6, YLa6) of the region of interest ROI corresponding to the transmission image 116a6. As the above-mentioned positional information 114 on the region of overlap ROO 3, for example, the ROI image generation section 223 derives the coordinates (the left upper end coordinates (Xb3, Yb3)) and the length (the physical region length XLb3, YLb3) of the region of overlap ROO 3.

The ROI image generation section 223 derives the positional information 114 on the region of overlap ROO 2 on the basis of the coordinates (the left upper end coordinates (Xa4, Ya4)) and the length (the physical region length XLa4, YLa4) of the region of interest ROI corresponding to the transmission image 116a4 and the coordinates (the left upper end coordinates (Xa6, Ya6)) and the length (the physical region length XLa6, YLa6) of the region of interest ROI corresponding to the transmission image 116a6. As the above-mentioned positional information 114 on the region of overlap ROO 2, for example, the ROI image generation section 223 derives the coordinates (the left upper end coordinates (Xb4, Yb4)) and the length (the physical region length XLb4, YLb4) of the region of overlap ROO 2.

The ROI image generation section 223 further generates three images (the ROI images 112a4, 112a5, and 112a6) in the regions of interest ROI in the captured image 111 on the basis of the three transmission images 116a4, 116a5, and 116a6 read out from the transmission data 120A and three images 118 in the regions of overlap ROO 1, ROO 2, and ROO 3. Specifically, the ROI image generation section 223 generates three images (the ROI images 112a4, 112a5, and 112a6) in the regions of interest ROI in the captured image 111 on the basis of the three transmission images 116a4, 116a5, and 116a6 and the images 118b1 and 118b2 obtained by the synthesis. The ROI image generation section 223 uses the region number (or the priority 115) read out from the transmission data 120A, and thereby determines whether the images 118b1 and 118b2 are added to any of the three transmission images 116a4, 116a5, and 116a6 included in the transmission data 120A.

The ROI image generation section 223 adds the image 118b2 to the transmission image 116a6 in which the region number (or the priority 115) is largest, and thereby generates an ROI image 119a6. The ROI image generation section 223 adds the image 118b1 to the transmission image 116a5 in which the region number (or the priority 115) is second largest, and thereby generates an ROI image 119a5.

The ROI image generation section 223 uses the transmission image 116a4 itself as an ROI image 119a4 in relation to the transmission image 116a4 to which the images 118b1 and 118b2 are not added. It is to be noted that the three pieces of positional information 113 received by the reception portion 210 correspond to three pieces of positional information on the ROI images 119a4, 119a5, and 119a6 obtained as described above, and correspond to the three pieces of positional information 113 on the ROI images 112a4, 112a5, and 112a6 in the captured image 111. Thus, the plurality of ROI images 119a4, 119a5, and 119a6 obtained as described above are equivalent to the plurality of ROI images 112a4, 112a5, and 112a6 in the captured image 111.

FIG. 9 illustrates one example of the captured image 111 in which two regions of interest ROI 7 and ROI 8 are included. As illustrated in FIG. 9, in a case where the other region of interest ROI 8 is included in one region of interest ROI 7, the frame 117 is, for example, as illustrated in FIG. 10. In the header region R1 of the frame 117 illustrated in FIG. 10, the priority 115 of the region of interest ROI 8 is 2 and is a value larger than the priority 115 (=1) of the region of interest ROI 7. Therefore, in the packet region R2 illustrated in FIG. 10, the entire ROI image 112 corresponding to the region of interest ROI 8 is omitted.

Effects

Subsequently, effects of the video transmission system 1 will be described.

In recent years, the number of usages for massively transmitting data having a large data amount is being increased. A large load is easily applied to a transmission system, and in the worst case, there is the possibility that the transmission system fails and it becomes difficult to perform data transmission.

In the past, in order to avoid failure of the transmission system, for example, the entire photographed image has not been transmitted, an object to be photographed has been specified and only a portion of the image in which the specified object is cut out has been transmitted. However, in a field of the data transmission, the transmission data amount is desired to be further reduced.

In contrast, in the present embodiment, in a plurality of images (ROI images 112) in the regions of interest ROI, the transmission data 120A is generated including the plurality of transmission images 116 in which the image 118 is omitted from the plurality of ROI images 112 and the plurality of pieces of positional information 113 so that the image 118 in the region of overlap ROO is not included redundantly. Through the processing, the transmission data amount can be reduced as compared to the case in which the entire captured image 111 is transmitted; further, the transmission data amount can be reduced as compared to the case in which each image cut out from the captured image 111 is transmitted as it is.

Further, in the present embodiment, the region number (or the priority 115) of the region of interest ROI is included in the transmission data 120A as the discrimination information capable of discriminating whether the omission of the region of overlap ROO is performed to any of a plurality of regions of interest ROI in the captured image 111. Through the processing, the amount of arithmetic operation can be reduced at the time of restoring the plurality of regions of interest ROI in the captured image 111 from the transmission data 120A. Also, since the data amount for reducing the above-mentioned arithmetic operation amount is extremely small, an influence is hardly exerted on the data amount of the transmission data 120A and the above-mentioned arithmetic operation amount can be reduced.

Further, in the present embodiment, the region number given to each region of interest ROI is used as the priority 115 and thereby it is determined whether the omission of the image 118 is performed to any of the plurality of ROI images 112. Through this processing, it is unnecessary to include both the region number and the priority 115 in the transmission data 120A, and therefore the transmission data amount can be reduced.

Further, in the present embodiment, the positional information 113 includes coordinates of a predetermined position in each region of interest ROI and information on a size of each region of interest ROI. Through this processing, since the data amount of the positional information 113 is extremely small, even if the positional information 113 is included in the transmission data 120A, an influence is hardly exerted to the data amount of the transmission data 120A. Thus, when restoring the plurality of regions of interest ROI in the captured image 111, the arithmetic operation amount can be reduced from the transmission data 120A with the transmission data amount being small.

Further, in the present embodiment, the frame 117 in which the plurality of pieces of positional information 113 and the plurality of transmission images 116 are associated with each other is included in the transmission data 120A. Through this processing, the arithmetic operation amount can be reduced from the transmission data 120A at the time of restoring the plurality of regions of interest ROI in the captured image 111. Further, since the data amount for reducing the above-mentioned arithmetic operation amount is extremely small, an influence is hardly exerted on the data amount of the transmission data 120A and the above-mentioned arithmetic operation amount can be reduced.

Further, in the present embodiment, in the frame 117, each transmission image 116 is separated and arranged for each pixel row of the transmission image 116 or for each predetermined area of the transmission image 116. Through this processing, the arithmetic operation amount can be reduced from the transmission data 120A at the time of restoring the plurality of regions of interest ROI in the captured image 111. Further, since the data amount for reducing the above-mentioned arithmetic operation amount is extremely small, an influence is hardly exerted on the data amount of the transmission data 120A and the above-mentioned arithmetic operation amount can be reduced.

Further, in the present embodiment, a plurality of images (ROI images 112) in the regions of interest ROI in the captured image 111 are generated on the basis of the plurality of transmission images 116 included in the received transmission data 120A and one or the plurality of images 118 in the regions of overlap ROO generated on the basis of the received transmission data 120A. Through this processing, even if the entire captured image 111 is not received, the images (ROI images 112) in each region of interest ROI to be imaged can be obtained. Further, even if each image cut out from the captured image 111 is not received as it is, the images (ROI images 112) in each region of interest ROI to be imaged can be obtained. Thus, as compared to the case in which the entire captured image is transmitted, the transmission data amount can be reduced; further, as compared to the case in which each image cut out from the captured image is transmitted as it is, the transmission data amount can be reduced.

Further, in the present embodiment, the region number (or the priority 115) of the region of interest ROI is used as the discrimination information capable of discriminating whether the omission of the region of overlap ROO is performed to any of the plurality of region of interest ROI in the captured image 111, and thereby it is determined whether the image 118 is added to any of the plurality of transmission images 116 included in the transmission data 120A. Through this processing, the arithmetic operation amount can be reduced from the transmission data 120A at the time of restoring the plurality of regions of interest ROI in the captured image 111. Further, since the data amount for reducing the above-mentioned arithmetic operation amount is extremely small, an influence is hardly exerted on the data amount of the transmission data 120A and the above-mentioned arithmetic operation amount can be reduced.

Further, in the present embodiment, the plurality of pieces of positional information 113 received by the reception portion 210 correspond to the plurality of pieces of positional information on the regions of interest ROI in the captured image 111. As described above, the plurality of pieces of positional information 113 corresponding to the plurality of pieces of positional information on the regions of interest ROI in the captured image 111 are transmitted to the video reception apparatus 200, and thereby the plurality of regions of interest ROI in the captured image 111 can be restored by using the plurality of pieces of positional information 113 in the video reception apparatus 200. Thus, as compared to the case in which each image cut out from the captured image is transmitted as it is, the transmission data amount can be reduced.

MODIFICATION EXAMPLES

Hereinafter, modification examples of the video transmission system 1 according to the above-mentioned embodiment will be described.

Modification Example A

FIG. 11 illustrates one modification example of the video transmission system 1 according to the above-mentioned embodiment. In place of the video reception apparatus 200 of the above-mentioned embodiment, the video transmission system 1 according to the present modification example includes two video reception apparatuses 200A and 200B including the same components as those of the video reception apparatus 200 of the above-mentioned embodiment. In the video reception apparatus 200A, a reception portion 210A has the same components as those of the reception portion 210 of the above-mentioned embodiment and an image processing portion 220A has the same components as those of the image processing portion 220 of the above-mentioned embodiment. In the video reception apparatus 200B, a reception portion 210B has the same components as those of the reception portion 210 of the above-mentioned embodiment and an image processing portion 220B has the same components as those of the image processing portion 220 of the above-mentioned embodiment.

In the present modification example, the image processing portion 120 includes two encoding sections 125A and 125B in place of the encoding section 125. The two encoding sections 125A and 125B encode each transmission image 116 and generate the compressed image data. Further, in the present modification example, the video transmission apparatus 100 includes two transmission portions 130A and 130B in place of the transmission portion 130. In the present modification example, the image processing portion 120 includes a distribution section 126 between the ROI cutting-out section 121 and the encoding sections 125 (125A and 125B). In the image processing portion 120, an output of the priority setting section 124 is input to the distribution section 126. Further, in the present modification example, a transmission portion 130A transmits transmission data output from the encoding section 125A to the video reception apparatus 200A via a transmission path 300A. Further, in the present modification example, a transmission portion 130B transmits transmission data output from the encoding section 125B to the video reception apparatus 200B via the transmission path 300A.

The distribution section 126 generates the plurality of transmission images 116 performed in the encoding section 125 of the above-mentioned embodiment. The distribution section 126 distributes a plurality of generated transmission images 116 into one or the plurality of transmission images 116 input to the encoding section 125A and one or the plurality of transmission images 116 input to the encoding section 125B. The distribution section 126 separates the plurality of generated transmission images 116 and the plurality of pieces of positional information 113 into a plurality of groups, generates, for each group, the frame 117 in which the plurality of transmission images 116 and one or the plurality of pieces of positional information 113 are associated with each other, and outputs the frame 117 to the encoding sections 125A and 125B. The encoding sections 125A and 125B generate the transmission data 120A for each input frame 117.

The encoding section 125A generates transmission data on the basis of one or the plurality of transmission images 116 input from the distribution section 126. The transmission data generated by the encoding section 125A fundamentally has configuration similarly to that of the transmission data 120A generated by the encoding section 125 according to the above-mentioned embodiment. The encoding section 125B generates transmission data on the basis of one or the plurality of transmission images 116 input from the distribution section 126. The transmission data generated by the encoding section 125B fundamentally has the configuration similarly to that of the transmission data 120A generated by the encoding section 125 of the above-mentioned embodiment.

The distribution section 126 has, for example, information (first set information) set as data to be processed by the image processing portion 220A and information (second set information) set as data to be processed by the image processing portion 220B. Thus, the distribution section 126 performs, for example, the above-mentioned distribution on the basis of these information (the first set information and the second set information).

As illustrated in FIG. 5, for example, three regions of interest ROI 112 (112a4, 112a5, and 112a6 are included) are assumed to be cut out from the captured image 111. In this case, the distribution section 126 distributes, for example, transmission images 116a4 and 116a6 including a small region of overlap ROO 3 to the encoding section 125A. Further, the distribution section 126 distributes, for example, the transmission image 116a5 having a region of overlap ROO 1 larger than the region of overlap ROO 3 to the encoding section 125B. As a result, the encoding section 125A generates a frame 117A as illustrated in FIG. 12 and the encoding section 125B generates a frame 117B as illustrated in FIG. 13. In the frame 117A, the regions of overlap ROO 1 and ROO 3 illustrated in FIG. 7B are not present, and therefore the arithmetic operation amount in the video reception apparatus 200A can be reduced as compared to the video reception apparatus 200 of the above-mentioned embodiment. Further, in the frame 117B, the regions of overlap ROO 1, ROO 2, and ROO 3 illustrated in FIG. 7B are not present, and therefore the arithmetic operation amount in the video reception apparatus 200B can be reduced as compared to the video reception apparatus 200 of the above-mentioned embodiment.

It is to be noted that, in the video transmission system 1 according to the above-mentioned embodiment, distribution processing may be performed to the transmission portions 130A and 130B after the encoding section 125. Note, however, that, in this case, the encoding section 125 needs to output data of a type capable of performing the above-mentioned distribution processing to a section that performs the above-mentioned distribution processing. In the section that performs the above-mentioned distribution processing, distribution processing similarly to that of the present modification example is performed, and thereby the arithmetic operation amount in the video reception apparatus 200B can be reduced as compared to the video reception apparatus 200 of the above-mentioned embodiment.

Modification Example B

FIG. 14 illustrates one modification example of the video transmission system 1 according to the above-mentioned modification example A. In the video transmission system 1 according to the above-mentioned modification example A, the video transmission system 1 according to the present modification example provides a distribution information transmission portion 230A in the video reception apparatus 200A and provides a distribution information transmission portion 230B in the video reception apparatus 200B. Outputs of the distribution information transmission portions 230A and 230B are coupled together with the distribution section 126.

The distribution information transmission portion 230A transmits, for example, information (set information) set as data to be processed by the video reception apparatus 200A to the distribution section 126. The distribution information transmission portion 230B transmits, for example, information (set information) set as data to be processed by the video reception apparatus 200B to the distribution section 126. Herein, the set information corresponds to transmission destination information that is information on a transmission destination of the transmission data output from the video transmission apparatus 100. The distribution section 126 performs the above-mentioned distribution, for example, on the basis of the set information input from the video reception apparatuses 200A and 200B. In similar manner to the modification example A, this processing permits the arithmetic operation amount in the video reception apparatuses 200A and 200B to be reduced as compared to the video reception apparatus 200 of the above-mentioned embodiment.

Modification Example C

FIG. 15 illustrates one modification example of the video transmission system 1 according to the above-mentioned modification example A. In the video transmission system 1 according to the above-mentioned modification example B, the video transmission system 1 according to the present modification example includes a video reception apparatus 200C in place of the video reception apparatuses 200A and 200B. The video reception apparatus 200C includes, for example, a reception portion 210C, image processing portions 220C and 220D, a distribution control portion 240, and a distribution information transmission portion 230C.

The reception portion 210C receives two types of transmission data output from the video transmission apparatus 100 via the transmission paths 300A and 300B. In two types of received transmission data, the reception portion 210C outputs data appropriate for the image processing portion 220C to the image processing portion 220C and, in two types of received transmission data, outputs data appropriate for the image processing portion 220D to the image processing portion 220D. The image processing portion 220C processes the transmission data input from the reception portion 210C. The image processing portion 220D processes the transmission data input from the reception portion 210C. Both of the image processing portions 220C and 220D have the configuration similarly to that of the image processing portion 220 of the above-mentioned embodiment. The image processing portions 220C and 220D each include, for example, IC chips. The image processing portions 220C and 220D each output, for example, real time data relating to an arithmetic processing capability to the distribution control portion 240. On the basis of the data input from the image processing portions 220C and 220D, the distribution control portion 240 generates control data for controlling the distribution section 126 and outputs the control data to the distribution information transmission portion 230C. The distribution information transmission portion 230C outputs the control data input from the distribution control portion 240 to the distribution section 126. The distribution section 126 adjusts the distribution processing on the basis of the control data input from the distribution information transmission portion 230C.

As illustrated in FIG. 5, for example, three regions of interest ROI 112 (112a4, 112a5, and 112a6 are included) assumed to be cut out from the captured image 111. In this case, the distribution section 126 distributes, for example, the transmission images 116a4 and 116a6 including the small region of overlap ROO 3 to the encoding section 125A. Further, the distribution section 126 distributes, for example, the transmission image 116a5 having the region of overlap ROO 1 larger than the region of overlap ROO 3 to the encoding section 125B. As a result, the encoding section 125A generates the frame 117A as illustrated in FIG. 12 and the encoding section 125B generates the frame 117B as illustrated in FIG. 13.

Afterward, a change in real time data occurs and the distribution control portion 240 generates, for example, control signals for replacing the transmission data input to the image processing portion 220C and the transmission data input to the image processing portion 220D with each other and outputs the control signals to the distribution information transmission portion 230C. The distribution information transmission portion 230C inputs the control signals input from the distribution control portion 240 to the distribution section 126. Then, on the basis of the control signals input from the distribution information transmission portion 230C, the distribution section 126 inputs the data input to the encoding section 125A to the encoding section 125B and inputs the data input to the encoding section 125B to the encoding section 125A. The encoding section 125A generates transmission data on the basis of the data input from the distribution section 126 and the encoding section 125B generates transmission data on the basis of the data input from the distribution section 126. The transmission portion 130A outputs the data input from the encoding section 125A to the reception portion 210C via the transmission path 300A. The transmission portion 130B outputs the data input from the encoding section 125B to the reception portion 210C via the transmission path 300B. The reception portion 210C inputs the transmission data input via the transmission path 300A to the image processing portion 220C and inputs the transmission data input via the transmission path 300B to the image processing portion 220D.

As described above, in the present modification example, appropriate distribution processing is performed by monitoring of a real time of the image processing portions 220C and 220D through the distribution control portion 240. Thus, data processing can be efficiently performed in the video reception apparatus 200C.

Application Example

Subsequently, an application example to an MIPI standard of the video transmission system 1 according to the above-mentioned embodiment and the modification examples thereof will be described. FIG. 16 illustrates one example of an outline of packets in a low-level protocol regulated by the MIPI standard. FIG. 17 illustrates one example of a frame format regulated by the MIPI standard.

In FIG. 16, information (for example, the priority information or the like) on the packet header is considered to be written in a place (place indicated by a black arrow) described as an "SP" (Short Packet). However, in the "SP," 16-bit is already defined and used in another application by the MIPI standard, and therefore in the information on the packet header, it is necessary to add and define a new packet header region in relation to contents exceeding 16-bit.

In FIG. 17, contents included in the header region R1 of the frames 117, 117A, and 117B are considered to be written in a place (place indicated by a black arrow) described as "embedded data." A certain level of contents of the data amount can be written in the "embedded data." Thus, contents included in the header region R1 of the frames 117, 117A, and 117B may be written in the place (place indicated by a black arrow) described as the "embedded data."

As described above, the present disclosure is described with reference to the embodiment and the modification examples thereof; further, the present disclosure is not limited to the above-mentioned embodiment and the like and various variant can be made. Further, the effects described in the present specification are merely illustrative or exemplified. The effects of the present disclosure are not intended to be limited to the effects which are described in the present specification. The present disclosure may have any effects except the effects described in the present specification.

In addition, for example, the present disclosure may also take the following configurations.

(1)
A video transmission apparatus including:
a detection section configured to detect a region of overlap in which two or more regions of interest are mutually overlapped with each other on the basis of a plurality of pieces of positional information on the regions of interest in a captured image;
a generation section configured to generate transmission data including the plurality of pieces of positional information and a plurality of third images in which a second image is omitted from a plurality of first images so that the second image in the region of overlap is not included redundantly in the plurality of first images in the regions of interest; and
a transmission portion configured to output the transmission data.

(2)
The video transmission apparatus according to (1) above, in which the generation section generates discrimination information capable of discriminating whether omission of the second image is performed to any of the plurality of first images and includes the discrimination information in the transmission data.

(3)
The video transmission apparatus according to (2) above, in which the generation section gives an identifier to each of the regions of interest and uses the identifier as the discrimination information, and thereby determines whether the omission of the second image is performed to any of the plurality of first images.

(4)
The video transmission apparatus according to any one of (1) to (3) above, in which the positional information includes coordinates of a predetermined position in each of the regions of interest and information on a size of each of the regions of interest.

(5)
The video transmission apparatus according to any one of (1) to (4) above, in which the generation section generates a frame in which the plurality of pieces of positional information and the plurality of third images are associated with each other, and simultaneously generates the transmission data including the frame.

(6)
The video transmission apparatus according to (5) above, in which the generation section separates and arranges, in the frame, each of the third images for each pixel row of the third image or for each predetermined area of the third image.

(7)
The video transmission apparatus according to any one of (1) to (6) above, in which the generation section separates the plurality of pieces of positional information and the plurality of third images into a plurality of groups, generates, for each of the groups, a frame in which one or the plurality of pieces of positional information and one or the plurality of third images are associated with each other, and generates the transmission data for each of the frames.

(8)
The video transmission apparatus according to (7) above, in which the generation section performs a grouping of the plurality of pieces of positional information and the plurality of third images on the basis of transmission destination information that is information on a transmission destination of the transmission data.

(9)
A video reception apparatus including:
a reception portion configured to receive transmission data including a plurality of third images and a plurality of pieces of positional information; and
an image processing portion configured to generate one or a plurality of second images in regions of overlap on the basis of one or the plurality of third images in the plurality of received third images and one or the plurality of pieces of positional information on the regions of overlap obtained from the plurality of pieces of positional information in the plurality of pieces of received positional information and generate a plurality of first images in regions of interest in a captured image on the basis of the plurality of received third images and one or the plurality of second images.

(10)
The video reception apparatus according to (9) above, in which
the transmission data includes discrimination information capable of discriminating whether omission of the second image is performed to any of the plurality of third images included in the transmission data, and
the image processing portion determines, by using the discrimination information, whether the second image is added to any of the plurality of third images included in the transmission data.

(11)
The video reception apparatus according to (9) or (10) above, in which the plurality of pieces of positional information received by the reception portion correspond to the plurality of pieces of positional information on the first images in the captured image.

(12)
The video reception apparatus according to any one of (9) to (11) above, in which
the image processing portion includes a plurality of image processing ICs, and
the image reception apparatus further includes:
a distribution control portion configured to determine a processing part of each of the third images from among the plurality of image processing ICs; and
a distribution information transmission portion configured to transmit distribution information on the processing part of each of the third images determined by the distribution control portion to a transmission source of the transmission data.

(13)
An image transmission apparatus comprising:
a detection circuitry configured to detect an overlap region in a captured image that is shared by two or more regions of interest based on a plurality of pieces of positional information that defines the two or more regions of interest in the captured image;
a generation circuitry configured to
generate a first image based on a first piece of positional information from the plurality of pieces of positional information, the first image including the overlap region, and the first image corresponding to a first region of interest of the two or more regions of interest,
generate one or more second images based on the overlap region and the plurality of pieces of positional information, the one or more second images excluding the overlap region, and the one or more second images corresponding to regions of interest other than the first region of interest of the two or more regions of interest, and generate transmission data including the first image, the one or more second images, and the plurality of pieces of positional information; and a transmission circuitry configured to output the transmission data.

(14)

The image transmission apparatus according to (13), wherein to detect the overlap region, the detection circuitry is configured to extract two or more sub-images corresponding to the two or more regions of interest from the captured image, determine the plurality of pieces of positional information from the two or more sub-images that are extracted, and detect the overlap region by deriving the overlap region from the plurality of pieces of positional information.

(15)

The image transmission apparatus according to any of (13) or (14), wherein the generation circuitry is further configured to generate exclusion information indicative of an exclusion of the overlap region from each of the one or more second images, and wherein the transmission data further includes the exclusion information.

(16)

The image transmission apparatus according to (15), wherein to generate the exclusion information, the generation circuitry is further configured to assign an identifier to each of the first image and the one or more second images, and wherein the identifier that is assigned to the each of the one or more second images is indicative of the exclusion of the overlap region from the one or more second images.

(17)

The image transmission apparatus according to any one of (13) to (16), wherein positional information associated with each of the two or more regions of interest includes coordinates of a predetermined position and size information.

(18)

The image transmission apparatus according to any of (13) to (17), wherein the generation circuitry is further configured to generate a frame including the first image and the one or more second images associated with corresponding ones of the plurality of pieces of positional information, and wherein the transmission data includes the frame.

(19)

The image transmission apparatus according to (18), wherein the generation circuitry is further configured to separate and arrange, in the frame, each of the one or more second images for each pixel row of the one or more second images or for each predetermined area of the one or more second images, the each predetermined area based on a corresponding one of the plurality of pieces of positional information.

(20)

The image transmission apparatus according to any one of (13) to (19), wherein the generation circuitry is further configured to separate the plurality of pieces of positional information and the one or more second images into a plurality of groups, generate a plurality of frames, each of the plurality of frames is associated with one of the plurality of groups, the each frame of the plurality of frames includes at least one of the plurality of pieces of positional information associated with at least one of the one or more second images, and generate the transmission data for each of the plurality of frames.

(21)

The image transmission apparatus according to any one of (13) to (20), wherein the generation circuitry is further configured to group the plurality of pieces of positional information and the one or more second images based on a transmission destination of the transmission data.

(22)

The image transmission apparatus according to any one of (13) to (21), wherein the generation circuitry is further configured to generate one or more third images based on the overlap region and the plurality of pieces of positional information, the one or more third images excluding a first portion of the overlap region and including a second portion of the overlap region, and the one or more third images corresponding to regions of interest other than the first region of interest of the two or more regions of interest, and generate the transmission data including the first image, the one or more second images, the one or more third images, and the plurality of pieces of positional information.

(23)

An image reception apparatus comprising:

a reception circuitry configured to receive transmission data including a first image, one or more second images, and a plurality of pieces of positional information; and an image processing circuitry configured to generate a plurality of third images associated with two or more regions of interest in a captured image, the plurality of third images based on the first image, the one or more second images, and the plurality of pieces of positional information.

(24)

The image reception apparatus according to (23), wherein the transmission data further includes exclusion information, and the image processing circuitry identifies the one or more second images from each other and from the first image based on the exclusion information.

(25)

The image reception apparatus according to (23) or (24), wherein the plurality of pieces of positional information received by the reception circuitry corresponds to a plurality of pieces of positional information associated with the plurality of third images in the captured image.

(26)

The image reception apparatus according to (23) to (25), further comprising:

a distribution control circuitry; and a distribution information transmission circuitry, wherein the image processing circuitry includes a plurality of image processing integrated circuits, wherein the distribution control circuitry is configured to determine a processing part of each of the one or more second images from among the plurality of image processing integrated circuits, and wherein the distribution information transmission circuitry is configured to transmit distribution information indicating the processing part of the each of the one or more second images determined by the distribution control circuitry to a transmission source of the transmission data.

(27) A system comprising:
an image transmission apparatus including
a detection circuitry configured to detect an overlap region in a captured image that is shared by two or more regions of interest based on a plurality of pieces of positional information that defines the two or more regions of interest in the captured image,
a generation circuitry configured to
generate a first image based on a first piece of positional information from the plurality of pieces of positional information, the first image including the overlap region, and the first image corresponding to a first region of interest of the two or more regions of interest,
generate one or more second images based on the overlap region and the plurality of pieces of positional information, the one or more second images excluding the overlap region, and the one or more second images corresponding to regions of interest other than the first region of interest of the two or more regions of interest, and
generate transmission data including the first image, the one or more second images, and the plurality of pieces of positional information, and
a transmission circuitry configured to output the transmission data; and
an image reception apparatus including
a reception circuitry configured to receive the transmission data including the first image, the one or more second images, and the plurality of pieces of positional information; and
an image processing circuitry configured to generate a plurality of third images associated with the two or more regions of interest in the captured image, the plurality of third images based on the first image, the one or more second images, and the plurality of pieces of positional information.

(28) The system according to (27), wherein
to detect the overlap region, the detection circuitry is configured to
extract two or more sub-images corresponding to the two or more regions of interest from the captured image,
determine the plurality of pieces of positional information from the two or more sub-images that are extracted, and
detect the overlap region by deriving the overlap region from the plurality of pieces of positional information.

(29) The system according to (27) or (28), wherein
the generation circuitry is further configured to
generate one or more fourth images based on the overlap region and the plurality of pieces of positional information, the one or more fourth images excluding a first portion of the overlap region and including a second portion of the overlap region, and the one or more fourth images corresponding to regions of interest other than the first region of interest of the two or more regions of interest, and
generate the transmission data including the first image, the one or more second images, the one or more fourth images, and the plurality of pieces of positional information, and
the image processing circuitry is further configured to generate the plurality of third images associated with the two or more regions of interest in the captured image based on the first image, the one or more second images, the one or more fourth images, and the plurality of pieces of positional information.

(30) The system according to (27) to (29), wherein
the generation circuitry is further configured to generate a frame including the one or more second images associated with corresponding ones of the plurality of pieces of positional information, and wherein the transmission data includes the frame.

(31) The system according to any one of (27) to (30), wherein
the transmission data further includes exclusion information, and
the image processing circuitry identifies the one or more second images from each other and from the first image based on the exclusion information.

(32) The system according to any one of (27) to (31), wherein
the image reception apparatus further includes
a distribution control circuitry; and
a distribution information transmission circuitry,
wherein the image processing circuitry includes a plurality of image processing integrated circuits,
wherein the distribution control circuitry is configured to determine a processing part of each of the one or more second images from among the plurality of image processing integrated circuits, and
wherein the distribution information transmission circuitry is configured to transmit distribution information indicating the processing part of the each of the one or more second images determined by the distribution control circuitry to the image transmission apparatus.

REFERENCE SIGNS LIST

1 . . . Video transmission system, 100 . . . Video transmission apparatus, 110 . . . Imaging portion, 111 . . . Captured image, 112, 112a1, 112a2, 112a4, 112a5, 112a6, 119, 119a1, 119a2, 119a4, 119a5, 119a6 . . . ROI image, 113, 114 . . . Positional information, 115 . . . Priority, 116, 116a1, 116a2, 116a4, 116a5, 116a6 . . . Transmission image, 117, 117A, 117B . . . Frame, 118, 118b1, 118b2 . . . Image, 120 . . . Image processing portion, 120A . . . Transmission data, 121 . . . ROI cutting-out section, 122 . . . ROI analysis section, 123 . . . Overlapping detection section, 124 . . . Priority setting section, 125, 125A, 125B . . . Encoding section, 126 . . . Distribution section, 130, 130A, 130B . . . Transmission portion, 200, 200A, 200B, 200C . . . Video reception apparatus, 210, 210A, 210B, 210C . . . Reception portion, 220, 220A, 220B, 220C, 220D . . . Image processing portion, 221 . . . Decoding section, 222 . . . Information extraction section, 223 . . . ROI image generation section, 230A, 230B, 230C . . . Distribution information transmission portion, 240 . . . Distribution control portion, 300, 300A, 300B . . . Transmission path, R1 . . . Header region, R2 . . . Packet region, R3 . . . Footer region, ROI, ROI 1, ROI 2, ROI 4, ROI 5, ROI 6, ROI 7, ROI 8 . . . Region of interest, ROO, ROO 1, ROO 2, ROO 3 . . . Region of overlap.

The invention claimed is:
1. An image transmission apparatus comprising:
a detection circuitry configured to detect an overlap region in a captured image that is shared by two or more regions of interest based on a plurality of pieces of positional information that defines the two or more regions of interest in the captured image;

a generation circuitry configured to
generate a first image based on a first piece of positional information from the plurality of pieces of positional information, the first image including the overlap region, and the first image corresponding to a first region of interest of the two or more regions of interest,
generate one or more second images based on the overlap region and the plurality of pieces of positional information, the one or more second images excluding the overlap region, and the one or more second images corresponding to regions of interest other than the first region of interest of the two or more regions of interest, and
generate transmission data including the first image, the one or more second images, and the plurality of pieces of positional information; and
a transmission circuitry configured to output the transmission data.

2. The image transmission apparatus according to claim 1, wherein
to detect the overlap region, the detection circuitry is configured to
extract two or more sub-images corresponding to the two or more regions of interest from the captured image,
determine the plurality of pieces of positional information from the two or more sub-images that are extracted, and
detect the overlap region by deriving the overlap region from the plurality of pieces of positional information.

3. The image transmission apparatus according to claim 1, wherein
the generation circuitry is further configured to generate exclusion information indicative of an exclusion of the overlap region from each of the one or more second images, and wherein the transmission data further includes the exclusion information.

4. The image transmission apparatus according to claim 3, wherein
to generate the exclusion information, the generation circuitry is further configured to assign an identifier to each of the first image and the one or more second images, and
wherein the identifier that is assigned to the each of the one or more second images is indicative of the exclusion of the overlap region from the one or more second images.

5. The image transmission apparatus according to claim 1, wherein
positional information associated with each of the two or more regions of interest includes coordinates of a predetermined position and size information.

6. The image transmission apparatus according to claim 1, wherein
the generation circuitry is further configured to generate a frame including the first image and the one or more second images associated with corresponding ones of the plurality of pieces of positional information, and wherein the transmission data includes the frame.

7. The image transmission apparatus according to claim 6, wherein
the generation circuitry is further configured to separate and arrange, in the frame, each of the one or more second images for each pixel row of the one or more second images or for each predetermined area of the one or more second images, the each predetermined area based on a corresponding one of the plurality of pieces of positional information.

8. The image transmission apparatus according to claim 1, wherein
the generation circuitry is further configured to
separate the plurality of pieces of positional information and the one or more second images into a plurality of groups,
generate a plurality of frames, each of the plurality of frames is associated with one of the plurality of groups, the each frame of the plurality of frames includes at least one of the plurality of pieces of positional information associated with at least one of the one or more second images, and
generate the transmission data for each of the plurality of frames.

9. The image transmission apparatus according to claim 8, wherein
the generation circuitry is further configured to group the plurality of pieces of positional information and the one or more second images based on a transmission destination of the transmission data.

10. The image transmission apparatus according to claim 1, wherein
the generation circuitry is further configured to
generate one or more third images based on the overlap region and the plurality of pieces of positional information, the one or more third images excluding a first portion of the overlap region and including a second portion of the overlap region, and the one or more third images corresponding to regions of interest other than the first region of interest of the two or more regions of interest, and
generate the transmission data including the first image, the one or more second images, the one or more third images, and the plurality of pieces of positional information.

11. The image transmission apparatus according to claim 1, wherein an entirety of the overlap region is only included in the first image.

12. The image transmission apparatus according to claim 1, wherein the generation circuitry is further configured to
assign an identifier to each of the two or more regions of interest, and
determine an (Analog-Digital) AD word length of data per (Analog-Digital) AD-converted pixel in the each of the two or more regions of interest, and
wherein the transmission data further includes the identifier to the each of the two or more regions of interest that are assigned and the AD word length of data per AD-converted pixel in the each of the two or more regions of interest that are determined.

13. An image reception apparatus comprising:
a reception circuitry configured to receive transmission data including a first image, one or more second images, and a plurality of pieces of positional information; and
an image processing circuitry configured to generate a plurality of third images associated with two or more regions of interest in a captured image, the plurality of third images based on the first image, the one or more second images, and the plurality of pieces of positional information.

14. The image reception apparatus according to claim 13, wherein
the transmission data further includes exclusion information, and
the image processing circuitry identifies the one or more second images from each other and from the first image based on the exclusion information.

15. The image reception apparatus according to claim 13, wherein
the plurality of pieces of positional information received by the reception circuitry corresponds to a plurality of pieces of positional information associated with the plurality of third images in the captured image.

16. The image reception apparatus according to claim 13, further comprising:
a distribution control circuitry; and
a distribution information transmission circuitry,
wherein the image processing circuitry includes a plurality of image processing integrated circuits,
wherein the distribution control circuitry is configured to determine a processing part of each of the one or more second images from among the plurality of image processing integrated circuits, and
wherein the distribution information transmission circuitry is configured to transmit distribution information indicating the processing part of the each of the one or more second images determined by the distribution control circuitry to a transmission source of the transmission data.

17. A system comprising:
an image transmission apparatus including
a detection circuitry configured to detect an overlap region in a captured image that is shared by two or more regions of interest based on a plurality of pieces of positional information that defines the two or more regions of interest in the captured image,
a generation circuitry configured to
generate a first image based on a first piece of positional information from the plurality of pieces of positional information, the first image including the overlap region, and the first image corresponding to a first region of interest of the two or more regions of interest,
generate one or more second images based on the overlap region and the plurality of pieces of positional information, the one or more second images excluding the overlap region, and the one or more second images corresponding to regions of interest other than the first region of interest of the two or more regions of interest, and
generate transmission data including the first image, the one or more second images, and the plurality of pieces of positional information, and
a transmission circuitry configured to output the transmission data; and
an image reception apparatus including
a reception circuitry configured to receive the transmission data including the first image, the one or more second images, and the plurality of pieces of positional information; and
an image processing circuitry configured to generate a plurality of third images associated with the two or more regions of interest in the captured image, the plurality of third images based on the first image, the one or more second images, and the plurality of pieces of positional information.

18. The system according to claim 17, wherein
to detect the overlap region, the detection circuitry is configured to
extract two or more sub-images corresponding to the two or more regions of interest from the captured image,
determine the plurality of pieces of positional information from the two or more sub-images that are extracted, and
detect the overlap region by deriving the overlap region from the plurality of pieces of positional information.

19. The system according to claim 17, wherein
the generation circuitry is further configured to
generate one or more fourth images based on the overlap region and the plurality of pieces of positional information, the one or more fourth images excluding a first portion of the overlap region and including a second portion of the overlap region, and the one or more fourth images corresponding to regions of interest other than the first region of interest of the two or more regions of interest, and
generate the transmission data including the first image, the one or more second images, the one or more fourth images, and the plurality of pieces of positional information, and
the image processing circuitry is further configured to generate the plurality of third images associated with the two or more regions of interest in the captured image based on the first image, the one or more second images, the one or more fourth images, and the plurality of pieces of positional information.

20. The system according to claim 17, wherein
the generation circuitry is further configured to generate a frame including the one or more second images associated with corresponding ones of the plurality of pieces of positional information, and wherein the transmission data includes the frame.

21. The system according to claim 17, wherein
the transmission data further includes exclusion information, and
the image processing circuitry identifies the one or more second images from each other and from the first image based on the exclusion information.

22. The system according to claim 17, wherein the image reception apparatus further includes
a distribution control circuitry; and
a distribution information transmission circuitry,
wherein the image processing circuitry includes a plurality of image processing integrated circuits,
wherein the distribution control circuitry is configured to determine a processing part of each of the one or more second images from among the plurality of image processing integrated circuits, and
wherein the distribution information transmission circuitry is configured to transmit distribution information indicating the processing part of the each of the one or more second images determined by the distribution control circuitry to the image transmission apparatus.

* * * * *